(12) United States Patent
Kim et al.

(10) Patent No.: US 12,114,338 B2
(45) Date of Patent: Oct. 8, 2024

(54) METHODS AND PROCEDURES FOR DYNAMIC CHANNEL ASSIGNMENT AND CHANGE IN UNMANNED AIRCRAFT SYSTEM (UAS) CONTROL AND NON-PAYLOAD COMMUNICATION

(71) Applicant: Electronics and Telecommunications Research Institute, Daejeon (KR)

(72) Inventors: Hee Wook Kim, Daejeon (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 228 days.

(21) Appl. No.: 17/326,237

(22) Filed: May 20, 2021

(65) Prior Publication Data
US 2021/0282129 A1 Sep. 9, 2021

Related U.S. Application Data

(62) Division of application No. 15/394,151, filed on Dec. 29, 2016, now abandoned.

(30) Foreign Application Priority Data

Jan. 27, 2016 (KR) ........................ 10-2016-0009969

(51) Int. Cl.
*H04W 72/04* (2023.01)
*H04W 72/51* (2023.01)
(Continued)

(52) U.S. Cl.
CPC .......... *H04W 72/51* (2023.01); *G08G 5/0013* (2013.01); *G08G 5/0069* (2013.01); *H04W 72/0453* (2013.01)

(58) Field of Classification Search
None
See application file for complete search history.

(56) References Cited

U.S. PATENT DOCUMENTS

| 5,230,082 A | 7/1993 | Ghisler et al. |
| 5,915,221 A | 6/1999 | Sawyer et al. |

(Continued)

FOREIGN PATENT DOCUMENTS

| EP | 2978258 A1 | 1/2016 |
| JP | 2015143092 A | 8/2015 |

(Continued)

OTHER PUBLICATIONS

H.W. Kim et al., Technical and Standardization Trends on Control and Non-Payload Communications for Unmanned Aircraft Systems, 2015 ETRI, vol. 30, No. 3.

(Continued)

*Primary Examiner* — Willie J Daniel, Jr.
(74) *Attorney, Agent, or Firm* — William Park & Associates Ltd.

(57) ABSTRACT

A dynamic channel assignment method includes receiving, at a ground control station (GCS), assignment of a first communication channel set from a spectrum authority before takeoff of the unmanned aircraft; receiving, at the GCS, assignment of a second communication channel set when the unmanned aircraft is to move from a first area using the first communication channel set to a second area using the second communication channel set due to a flight plan of the unmanned aircraft after takeoff of the unmanned aircraft; and after the unmanned aircraft enters the second area, maintaining, at the GCS, the first communication channel set when the unmanned aircraft reenters the first area due to the flight plan, and returning, at the GCS, the first communication channel set to the spectrum authority when (Continued)

the unmanned aircraft does not reenter the first area due to the flight plan.

8 Claims, 13 Drawing Sheets

(51) Int. Cl.
G08G 5/00 (2006.01)
H04W 72/0453 (2023.01)

(56) References Cited

U.S. PATENT DOCUMENTS

| | | | |
|---|---|---|---|
| 9,497,683 B2 | 11/2016 | Park et al. | |
| 9,836,047 B2 | 12/2017 | Clark et al. | |
| 10,039,114 B2 | 7/2018 | Tan | |
| 2002/0160785 A1 | 10/2002 | Ovesjo et al. | |
| 2002/0177439 A1 | 11/2002 | Karlsson et al. | |
| 2003/0137953 A1 | 7/2003 | Chae et al. | |
| 2004/0125784 A1 | 7/2004 | Lee et al. | |
| 2004/0185870 A1 | 9/2004 | Matsuda | |
| 2005/0153743 A1 | 7/2005 | Berra et al. | |
| 2005/0221824 A1 | 10/2005 | Lee et al. | |
| 2006/0092960 A1 | 5/2006 | Lee et al. | |
| 2006/0217090 A1 | 9/2006 | Pan | |
| 2007/0010252 A1 | 1/2007 | Balachandran et al. | |
| 2007/0161347 A1 | 7/2007 | Ma et al. | |
| 2008/0221951 A1 | 9/2008 | Stanforth et al. | |
| 2009/0047961 A1 | 2/2009 | Kim | |
| 2009/0161610 A1 | 6/2009 | Kang et al. | |
| 2009/0163221 A1 | 6/2009 | Abedi | |
| 2009/0164638 A1 | 6/2009 | Jang et al. | |
| 2009/0286534 A1 | 11/2009 | Garg et al. | |
| 2009/0296635 A1 | 12/2009 | Hui et al. | |
| 2009/0298522 A1 | 12/2009 | Chaudhri et al. | |
| 2010/0279702 A1 | 11/2010 | Kazmi et al. | |
| 2011/0014921 A1 | 1/2011 | Neil | |
| 2013/0311669 A1 | 11/2013 | Reimers et al. | |
| 2013/0324070 A1 | 12/2013 | Bennett et al. | |
| 2014/0187247 A1 | 7/2014 | Sarkar et al. | |
| 2014/0362717 A1 | 12/2014 | Koskinen et al. | |
| 2015/0142579 A1 | 5/2015 | Xiong | |
| 2015/0181601 A1 | 6/2015 | Schmidt et al. | |
| 2016/0088636 A1 | 3/2016 | Zhao et al. | |
| 2016/0094999 A1 | 3/2016 | Yu et al. | |
| 2016/0192358 A1 | 6/2016 | Lee et al. | |
| 2016/0227416 A1 | 8/2016 | Suzuki et al. | |
| 2016/0363929 A1 | 12/2016 | Clark et al. | |
| 2017/0041802 A1 | 2/2017 | Sun et al. | |
| 2017/0188222 A1 | 6/2017 | Cooper | |
| 2017/0208476 A1 | 7/2017 | Khambekar et al. | |
| 2017/0331658 A1 | 11/2017 | Chen et al. | |
| 2018/0139074 A1 | 5/2018 | Hong et al. | |
| 2018/0160433 A1 | 6/2018 | Kim et al. | |
| 2018/0241514 A1 | 8/2018 | Kim | |

FOREIGN PATENT DOCUMENTS

| | | |
|---|---|---|
| KR | 1020110003986 A | 1/2011 |
| KR | 101036100 B1 | 5/2011 |
| KR | 1020110088053 A | 8/2011 |
| KR | 101079655 B1 | 11/2011 |
| KR | 1020130062797 A | 6/2013 |
| KR | 1020150117879 A | 10/2015 |
| WO | 2016140410 A1 | 9/2016 |

OTHER PUBLICATIONS

Bretmersky, Steven C., et al. "Communications technology assessment for the unmanned aircraft system (UAS) control and non-payload communications (CNPC) link." (2014).

Jim Griner, "Unmanned Aircraft Systems (UAS) Integration in the National Airspace System (NAS) Project", NASA Glenn Research Center, Apr. 22, 2015, pp. 1-21.

Kerczewski, "Spectrum for UAS control and Non-Payload Communications," 2013 Integrated Communications, Navigation and Surveillance Conference (ICNS), Herndon, VA, 2013, pp. 1-21. (Year: 2013).

R. J. Kerczewski, J. H. Griner, Control and non-payload communications links for integrated unmanned aircraft operations, NASA, 2012 (Year: 2012).

METHODS AND PROCEDURES FOR DYNAMIC CHANNEL ASSIGNMENT AND CHANGE IN UNMANNED AIRCRAFT SYSTEM (UAS) CONTROL AND NON-PAYLOAD COMMUNICATION

CROSS-REFERENCE TO RELATED APPLICATION(S)

This application is a divisional application of U.S. patent application Ser. No. 15/394,151, filed on Dec. 29, 2016, and claims the priority benefit of Korean Patent Application No. 10-2016-0009969 filed on Jan. 27, 2016, in the Korean Intellectual Property Office, the disclosure of which is incorporated herein by reference for all purposes.

BACKGROUND

1. Field

One or more example embodiments relate to methods and procedures for dynamic channel assignment and change for controlling an unmanned aircraft, and more particularly, to methods and procedures for dynamically assigning and changing a communication channel in a point-to-point (P2P) and point-to-multipoint (P2MP) unmanned aircraft control communication system in order to efficiently use and manage a limited unmanned aircraft control spectrum in the national airspace.

2. Description of Related Art

All of constituent elements required for an entire flight process, including a control communication system, such as takeoff/cruise, flight control, landing/retrieval, etc., together with an unmanned aircraft are exclusively referred to as an unmanned aircraft system (UAS) or a remotely piloted aircraft system (RPAS).

The UAS includes unmanned aircraft ground control equipment, an unmanned aircraft, and a data link. The data link refers to a wireless data link between a ground radio station (GRS) and the unmanned aircraft, and may be classified into a USA ground control and non-payload communication (CNPC) data link and a UAS payload data link.

A payload data link is a link used to transfer data associated with payload, and is generally a wideband compared to a CNPC data link. The CNPC data link is a link used to transfer data associated with unmanned aircraft flight control, UAS state monitoring, and CNPC link management, and includes a pilot/air traffic control (ATC) relay link and a UAS control link.

The pilot/ATC relay link is a communication link used to relay voice and data between a pilot and an ATC through the unmanned aircraft, and the UAS control link is a link used to transfer control information associated with navigation safety between the pilot and the unmanned aircraft.

The UAS control link may be classified into a telecommand (TC) link and a telemetry (TM) link. The TC link is an uplink used to transfer flight orbit control information, all of unmanned aircraft system control information required for safe flight, etc., from a pilot on the ground to the unmanned aircraft, and the TM link is a downlink used to transfer a location, altitude, and speed of the unmanned aircraft, UAS system operation mode and state, navigation support data, tracking associated with detection and avoidance, a weather radar, video information, etc., from the unmanned aircraft to the pilot on the ground.

A frequency for the unmanned aircraft ground CNPC data link generally considers a C (5030 to 5091 MHz) band, which is distributed as a new exclusive band in WRC-12. In addition, a band distributed for an aeronautical mobile service may be considered, such as an L (960 to 1164 MHz) band of which a standard is prepared to be available for an aeronautical mobile service in WRC-12.

In the C band, a frequency jamming effect with an existing system and a multipath delay spread are relatively small. On the contrary, a directional antenna needs to be used to secure a link margin and a Doppler effect of the C band is great by five times compared to that of the L band.

A low frequency band distributed for an aeronautical mobile service, such as the L band, has a relatively excellent propagation characteristic compared to the C band. The L band has a relatively low propagation loss of about 14 dB compared to the C band. However, existing navigation systems, such as distance measurement equipment (DME), automatic dependent surveillance-broadcast (ADS-B), a tactical air Navigation system (TACAN), etc., are operated in the confusion. Thus, a frequency securement is difficult and a multipath delay spread is great.

In general, the secured C band may be considered as a basic link of ground CNPC and the low frequency band, for example, the L band, an ultra high frequency (UHF), etc., may be used to increase the availability of the CNPC data link for navigation safety of the unmanned aircraft.

A connection type of the ground CNPC data link may include a point-to-point (P2P) type and a network-based point-to-multipoint (P2MP) type.

In the P2P type, a single ground control station (GCS) directly forms a data link with the unmanned aircraft. The P2P type is generally considered in an existing UAS.

In the network-based P2MP type, ground radio stations (GRSs) are connected to a network and each GCS exchanges information with the unmanned aircraft through a ground network and a GRS.

The P2MP type capable of simultaneously forming a communication link with a plurality of unmanned aircrafts and also forming a national network is to be considered as a next generation CNPC data link in order to expand the application of public and private unmanned aircrafts. Technology associated with such a P2MP UAS CNPC system has not been actively proposed.

Also, a CNPC channel is to be assigned to operate an existing P2P UAS CNPC system. In an existing scheme, a spectrum authority statically assigns a channel during a relatively long time, for example, generally, 1 year or more, when registering a UAS CNPC system. Thus, a channel that is assigned to a specific UAS CNPC system may not be readily used at another UAS CNPC system.

Accordingly, there is a need for technology for efficiently using communication frequency resources for controlling an unmanned aircraft that may efficiently operate a plurality of unmanned aircrafts in a limited frequency band exclusive for controlling an unmanned aircraft in order to achieve the stable operation of the unmanned aircraft and expand the demand for unmanned aircrafts.

SUMMARY

An aspect of at least one example embodiment is to provide a user with a new method and procedure for dynamically assigning and changing a channel in an unmanned aircraft system (UAS) control and non-payload communication (CNPC) system that may be applicable to a point-to-multipoint (P2MP) CNPC system capable of enhancing a use of limited CNPC frequency and supporting a plurality of unmanned aircrafts.

Technical subjects to be achieved herein are not limited to the aforementioned subjects and one of ordinary skill in the art may understand other technical subjects not described herein from the following description.

According to an aspect, there is provided a dynamic channel assignment method of a point-to-point (P2P) UAS including a spectrum authority, a ground control station (GCS), a ground radio station (GRS), and an unmanned aircraft, the method including receiving, at the GCS, assignment of a first communication channel set for communication between the GCS and the unmanned aircraft from the spectrum authority before takeoff of the unmanned aircraft; receiving, at the GCS, assignment of a second communication channel set before the unmanned aircraft enters a second area when the unmanned aircraft is to move from a first area in which the first communication channel set is available to the second area in which the second communication channel set different from the first communication channel set is available due to a flight plan of the unmanned aircraft after takeoff of the unmanned aircraft; performing, at the GCS, communication with the unmanned aircraft using the second communication channel set when the unmanned aircraft enters the second area; and maintaining, at the GCS, the first communication channel set when the unmanned aircraft reenters the first area from the second area due to the flight plan of the unmanned aircraft, and returning, at the GCS, the first communication channel set to the spectrum authority when the unmanned aircraft does not reenter the first area due to the flight plan of the unmanned aircraft.

The dynamic channel assignment method may further include returning, at the GCS, the first communication channel set to the spectrum authority and receiving assignment of a third communication channel set available in a third area from the spectrum authority when the unmanned aircraft enters the third area due to the flight plan of the unmanned aircraft.

The dynamic channel assignment method may further include monitoring, at the GCS, a link state of a communication channel set in use; and changing, at the GCS, the communication channel set by returning the communication channel set in use to the spectrum authority and by receiving assignment of a new communication channel set when the link state of the communication channel set in use does not satisfy a reference value.

The communication channel set may include a primary channel and a backup channel, and the primary channel and the backup channel may be selected from different frequency bands, respectively.

The changing of the communication channel set may include initially changing one of the primary channel and the backup channel included in the communication channel set and subsequently changing a remaining one thereof.

The dynamic channel assignment method may further include providing, at the GCS, information of a communication channel set assigned from the spectrum authority to the GRS; and verifying, at the GRS, whether the communication channel set is assigned from the spectrum authority, based on information of the communication channel set.

The spectrum authority may further provide information indicating that the communication channel set is assigned from the spectrum authority when assigning the communication channel set to the GCS, information of the communication channel set provided from the GCS to the GRS may include information indicating that the communication channel set is assigned from the spectrum authority, and the GRS may verify whether the communication channel set is assigned from the spectrum authority based on information indicating that the communication channel set is assigned from the spectrum authority.

According to another aspect, there is provided a dynamic channel assignment method of a P2MP UAS including a spectrum authority, a GCS, a GRS supporting a plurality of unmanned aircrafts, and an unmanned aircraft, the method including transmitting, at the GRS, information of the GRS to the spectrum authority, and receiving assignment of an uplink frequency set from the spectrum authority; registering, at the spectrum authority, the uplink frequency set and information of the GRS to a database of the spectrum authority; receiving, at the GCS, assignment of a first communication channel set for communication between the GCS and the unmanned aircraft from the spectrum authority before takeoff of the unmanned aircraft; receiving, at the GCS, assignment of a second communication channel set before the unmanned aircraft enters a second area when the unmanned aircraft is to move from a first area in which the first communication channel set is available to the second area in which the second communication channel set different from the first communication channel set is available due to a flight plan of the unmanned aircraft after takeoff of the unmanned aircraft; performing, at the GCS, communication with the unmanned aircraft using the second communication channel set when the unmanned aircraft enters the second area; and maintaining, at the GCS, the first communication channel set when the unmanned aircraft reenters the first area from the second area due to the flight plan of the unmanned aircraft, and returning, at the GCS, the first communication channel set to the spectrum authority when the unmanned aircraft does not reenter the first area due to the flight plan of the unmanned aircraft; and returning, at the GCS, the first communication channel set to the spectrum authority and receiving assignment of a third communication channel set available in a third area from the spectrum authority when the unmanned aircraft enters the third area due to the flight plan of the unmanned aircraft.

The dynamic channel assignment method may further include monitoring, at the GCS, a link state of a communication channel set in use; and changing, at the GCS, the communication channel set by returning the communication channel set in use to the spectrum authority and by receiving assignment of a new communication channel set when the link state of the communication channel set in use does not satisfy a reference value.

The receiving the assignment of the communication channel set may include receiving an approval of a GRS used at the GCS from the spectrum authority, and receiving assignment of a time slot in an uplink frequency assigned to the GRS and a downlink frequency as the communication channel set, and the changing of the communication channel set may include changing, at the GCS, the downlink frequency of the communication channel set and the time slot of the uplink frequency.

The communication channel set may include a primary channel and a backup channel, and the primary channel and the backup channel may be selected from different frequency bands, respectively.

The changing of the communication channel set may include initially changing one of the primary channel and the backup channel included in the communication channel set and subsequently changing a remaining one thereof.

The dynamic channel assignment method may further include providing, at the GCS, information of a communication channel set assigned from the spectrum authority to the GRS; and verifying, at the GRS, whether the communication channel set is assigned from the spectrum authority, based on information of the communication channel set.

The spectrum authority may further provide information indicating that the communication channel set is assigned from the spectrum authority when assigning the communication channel set to the GCS, information of the communication channel set provided from the GCS to the GRS may include information indicating that the communication channel set is assigned from the spectrum authority, and the GRS may verify whether the communication channel set is assigned from the spectrum authority based on information indicating that the communication channel set is assigned from the spectrum authority.

According to another aspect, there is provided a distributed channel assignment method of a P2P UAS including a spectrum authority, a GCS, a GRS supporting a plurality of unmanned aircrafts, and an unmanned aircraft, the method including selecting, at the GCS, available channels for communication with the unmanned aircraft based on information provided from the spectrum authority; requesting, at the GCS, the spectrum authority for assigning a single channel among the available channels; verifying, at the spectrum authority, whether the requested channel is available in a flight area of the unmanned aircraft, and determining whether to approve the requested channel; and assigning, at the spectrum authority, the requested channel to the GCS when the requested channel is determined to be approved.

The distributed channel assignment method may further include providing, at the spectrum authority, an assignment database and an interference analysis algorithm for determining whether to assign the channel to the GCS, prior to selecting, at the GCS, the available channels. The selecting may include analyzing, at the GCS, performing interference analysis between frequency channels using the interference analysis algorithm and selecting a communication channel compatible with an existing communication channel present in a current flight area of the unmanned aircraft during flight of the unmanned aircraft.

The requesting may include providing, at the GCS, at least one of communication link waveform information including a bandwidth of the requested channel, a maximum transmission power, and a receiver sensitivity, a GRS to be used at the GCS, and a transceiver location and an antenna pattern of the unmanned aircraft.

The distributed channel assignment method may further include providing, at the GCS, communication channel link state information between the GCS and the unmanned aircraft to the spectrum authority; and updating, at the spectrum authority, the interference analysis algorithm based on the communication channel link state information.

The distributed channel assignment method may further include notifying, at the spectrum authority, the GCS that the channel assignment is disallowed if the channel assignment is impossible; receiving, at the GCS, the updated interference analysis algorithm from the spectrum authority, reselecting an available channel using the updated interference analysis algorithm, and requesting again the spectrum authority for the reselected available channel; and assigning, at the spectrum authority, the channel to the GCS when the requested channel is determined to be approved.

The requesting again the reselected available channel may include providing, at the GCS, at least one of the changed flight plan of the unmanned aircraft, communication link waveform information including a bandwidth of the requested channel, a maximum transmission power, and a receiver sensitivity, a GRS to be used at the GCS, and a transceiver location and an antenna pattern of the unmanned aircraft in response to a change in the flight plane of the unmanned aircraft, the communication link waveform information, the GRS to be used at the GCS, and the transceiver location and the antenna pattern of the unmanned aircraft.

According to some example embodiments, it is possible to provide a user with a new method and procedure for dynamically assigning and changing a channel in a UAS CNPC system that may be applicable to a P2MP CNPC system capable of enhancing a use of limited CNPC frequency and simultaneously supporting a plurality of unmanned aircrafts.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1A:
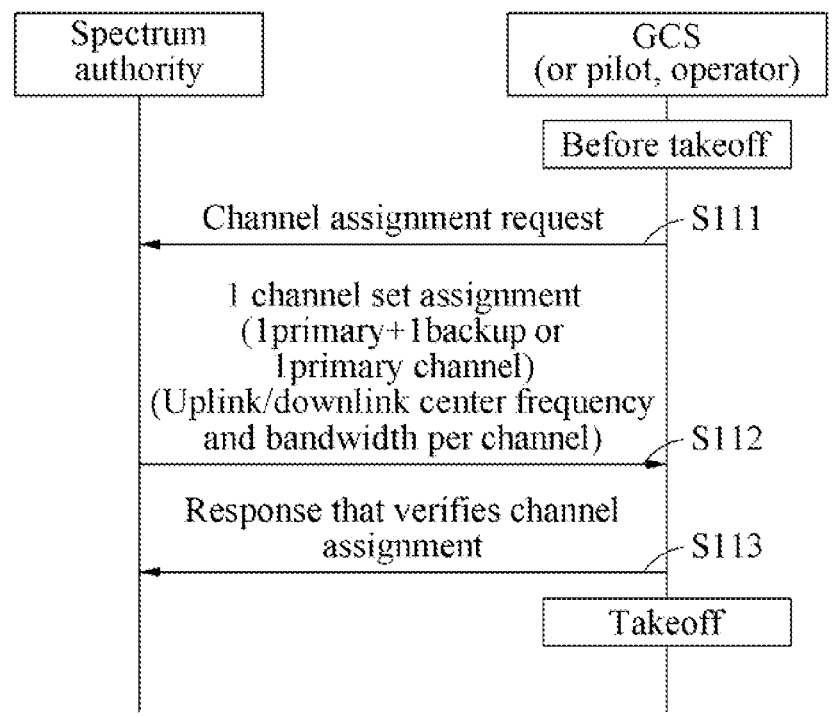
FIGS. 1A through 1C illustrate examples of a new channel assignment procedure after channel assignment and channel return in a point-to-point (P2P) unmanned aircraft control and non-payload communication (CNPC) system according to example embodiments.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Terms, such as first, second, A, B, (a), (b), and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component. Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

The example embodiments relate to methods and procedures in which a spectrum authority dynamically assigns and changes a channel to a next generation uplink time division multiple access (TDMA)/downlink frequency division multiple access (FDMA) point-to-multipoint (P2MP) unmanned aircraft control communication system including a ground ratio station (GRS) supporting a plurality of unmanned aircrafts as well as an existing P2P unmanned aircraft control communication system based on distributed and centralized channel assignment methods capable of efficiently assigning and managing a limited unmanned aircraft control spectrum through the spectrum authority. The proposed methods and procedures may be applicable to other systems having a similar operation concept as well as an unmanned aircraft control and non-payload communication (CNPC) system.

Hereinafter, dynamic channel assignment methods and procedures between a spectrum authority and a UAS CNPC system including a ground control station (GCS) and P2P and P2MP GRSs.

A channel assignment procedure of the P2P unmanned aircraft CNPC system will be described with reference to FIGS. 1A through 1C.

Figure 1B:
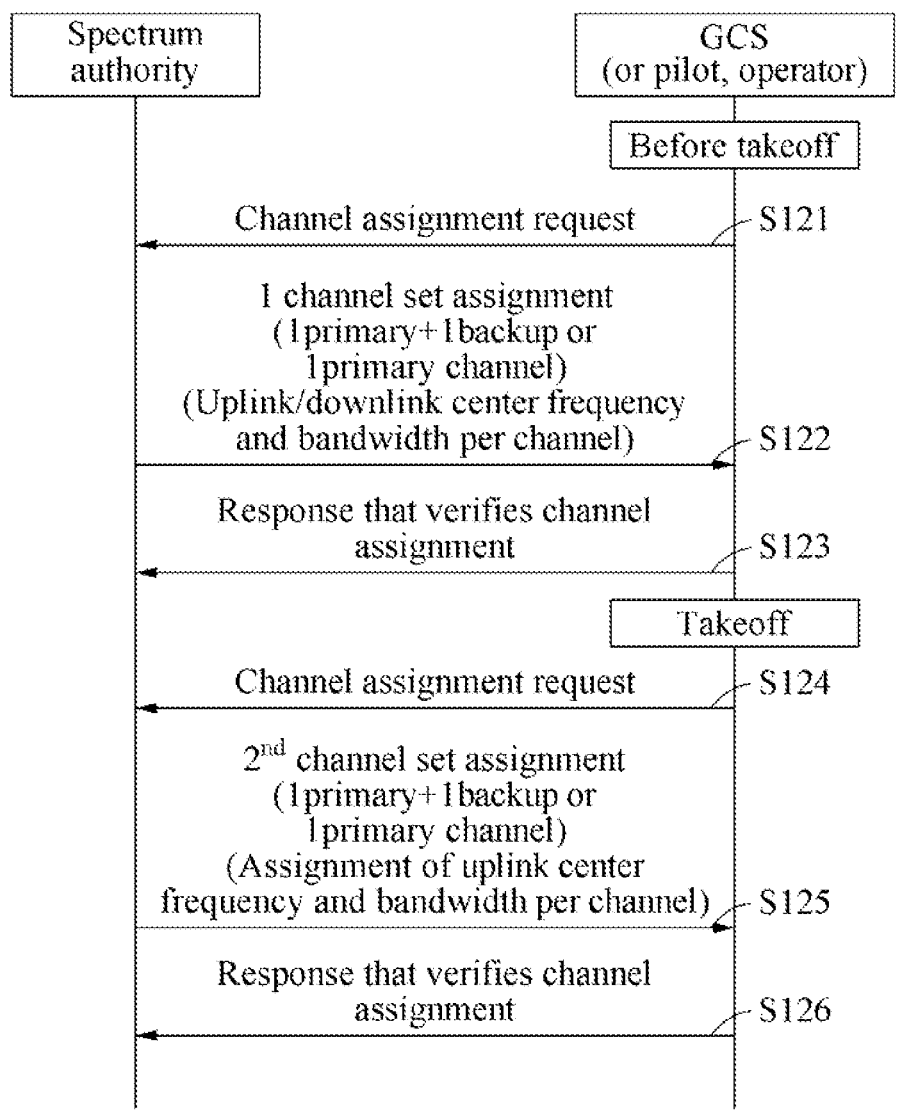
Figure 1C:
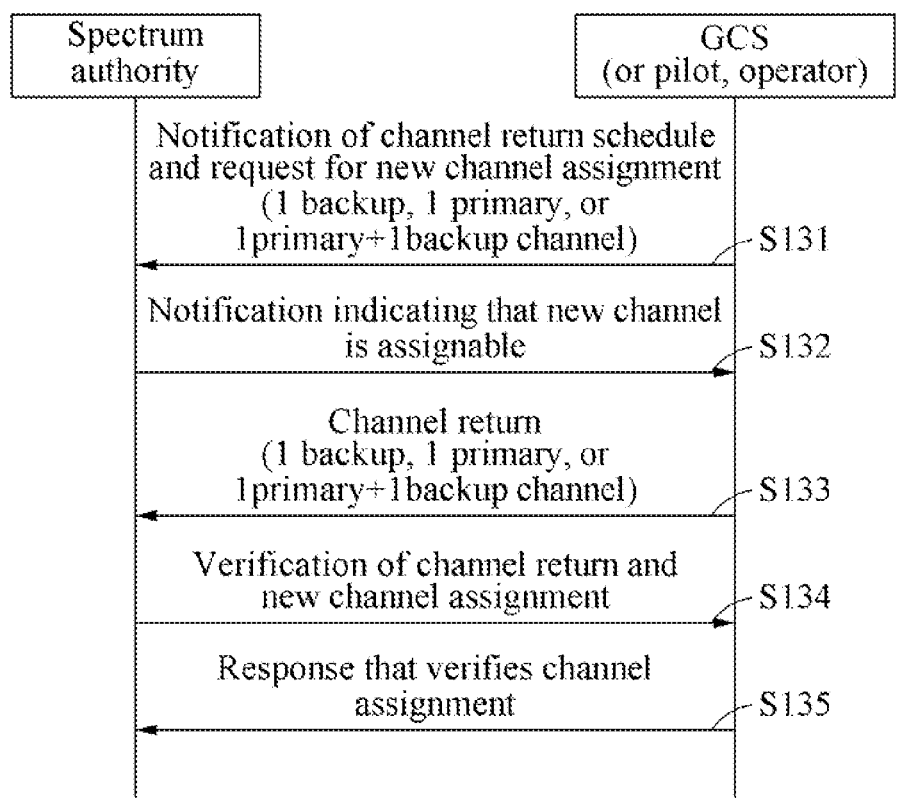

FIGS. 1A through 1C illustrate examples of a new channel assignment procedure after channel assignment and channel return in a P2P unmanned aircraft CNPC system according to example embodiments.

FIG. 1A illustrates an example of assigning a single frequency channel set to the P2P unmanned aircraft CNPC system according to example embodiments.

Referring to FIG. 1A, in operation S111, a GCS requests a spectrum authority for assigning a single CNPC channel set available in an airspace volume present in a flight path of an unmanned aircraft before takeoff.

In operation S112, in response to the request, the spectrum authority assigns a frequency channel to the GCS based on a CNPC channel set unit.

Here, the frequency channel to be assigned may include a center frequency and a channel bandwidth, and the channel set may include a primary channel or a backup channel.

Whether to constitute the channel set using the primary channel or using the primary channel and the backup channel may be determined at the CCS based on a channel support capability of the unmanned aircraft CNPC system, a current CNPC spectrum use state, and the like. If necessary, the spectrum authority may recommend a configuration of the channel set to the GCS.

That is, in operation S111, the GCS may request the spectrum authority for assigning a single primary channel or a single primary channel and a single backup channel as a CNPC channel for operating the unmanned aircraft based on a flight plan, an unmanned aircraft/GRS capability, a current CNPC channel use state, and the like.

In operation S113, in response to the channel assignment, the GCS transmits, to the spectrum authority, a response that verifies the channel assignment.

FIG. 1B illustrates an example of assigning an additional frequency set to the P2P unmanned aircraft CNPC system after assigning a frequency set according to example embodiments.

Operations S121 through S123 of FIG. 1B are the same as operations S111 through S113 of FIG. 1A.

A CNPC channel set includes information about airspace volume in which a corresponding channel is available. When a flight plan to another airspace volume in which the assigned CNPC channel set is unavailable is included in a flight path of the unmanned aircraft, the flight to the other airspace volume is to be prepared.

Referring to FIG. 1B, in operation S124, the GCS requests the spectrum assignment for assigning another CNPC channel set available for the flight to the other airspace volume.

In operation S125, in response to the request, the spectrum assignment assigns a frequency channel to the GCS based on a CNPC channel set unit.

In operation S126, in response to the channel assignment, the GCS transmits, to the spectrum assignment, a response that verifies the channel assignment.

FIG. 1C illustrates an example in which the P2P unmanned aircraft CNPC system returns the assigned frequency set and receives assignment of a new frequency set according to example embodiments.

If three or more airspace volumes each in which a different CNPC channel set is available are present in the flight path of the unmanned aircraft, the GCS may use three CNPC channel sets in the flight path.

The GCS may continuously request the spectrum authority for assigning a CNPC channel set. However, since a CNPC spectrum is limited, a single unmanned aircraft CNPC system may be limited to maintain maximum two CNPC channel sets.

To secure another channel set in a state in which two CNPC channel sets are secured, the GCS needs to return one of the existing channel sets to the spectrum authority and then request assignment of another channel set.

A backup frequency channel may be assigned simultaneously together with a primary frequency channel or may be assigned independently. That is, only the backup frequency channel between the primary frequency channel and the backup frequency channel may be changed.

For example, when the unmanned aircraft is flying in the second airspace volume, the GCS may return an existing single channel used in the first airspace volume and may request the spectrum authority for assigning a CNPC channel available in the third airspace volume.

Referring to FIG. 1C, in operation S131, the GCS notifies the spectrum authority of a channel return schedule, and requests the spectrum authority for assigning a new channel.

That is, the GCS notifies the spectrum authority that the GCS is to return the existing single channel used in the first airspace volume, and requests the spectrum authority for assigning a CNPC channel available in the third airspace volume.

In operation S132, the spectrum authority notifies the GCS that the new channel is assignable.

In operation S133, the GCS returns the maintained channel to the spectrum authority.

In operation S134, the spectrum authority verifies the channel return and assigns the new channel to the GCS.

In operation S135, the GCS receives assignment of the new channel and transmits, to the spectrum authority, a response that verifies the channel assignment.

In the above procedure, if two or more frequency bands for CNPC are present, one of channels in one of the two or more frequency bands may be selected as a primary frequency channel and one of channels in another one thereof may be selected as a backup frequency channel.

A backup band is used to enhance the CNPC link availability, and a backup channel and a primary frequency channel are not selected from a single CNPC band due to a nonlinearity issue of an amplifier of a transmitter for a GRS and an unmanned aircraft, and the like.

For example, in the case of C band and L band assigned for CNPC in WRC-12, a primary channel may be selected only from the C band by using the C band as a primary band and a backup channel may be selected only from the L band by using the L band as a backup band.

Also, in operations S131 through S135, when changing the primary channel, the channel bandwidth as well as the center frequency may also be changed.

However, during the flight of the unmanned aircraft, change of the channel frequency and the bandwidth is not recommended based on a service rate required at the unmanned aircraft in real time. Thus, only in the case of requesting assignment of another primary channel so that the unmanned aircraft may move to the airspace volume in which the primary frequency channel currently in use is unavailable, change of the frequency band may also be requested.

In general, when requesting a bandwidth for the primary channel before takeoff, the bandwidth may be assigned based on a CNPC service to be used during the entire flight of the unmanned aircraft. Thus, when changing the primary channel, change of the channel bandwidth may not be considered generally.

However, when entering another airspace volume, a relatively great bandwidth may be requested to be assigned. In this case, a relatively large amount of time may be used to receive channel assignment from the spectrum authority. Thus, a relatively small bandwidth may be requested to be assigned based on only a required service. In this case, change of the bandwidth may also be considered in addition to change of the channel frequency.

Two CNPC channel sets that a single unmanned aircraft CNPC system may simultaneously maintain are for different airspace volumes that do not allow the same CNPC channel based on a frequency reuse policy.

Due to a limited CNPC spectrum, a single unmanned aircraft CNPC system does not simultaneously maintain two CNPC channel sets each available in a single airspace volume.

Accordingly, change of the primary channel and the backup channel in a specific airspace volume may proceed through a procedure of returning an existing channel and receiving assignment of a new channel. In this case, the primary channel and the backup channel may not be simultaneously changed in order to prevent CNPC link outage between return of the existing channel and use of the new channel.

Meanwhile, frequency change of the primary channel or the backup channel in the specific airspace volume is performed generally when a CNPC backup link is in a poor state. When the link state is poor during monitoring the link state of the primary channel or the backup channel, for example, monitoring a bit error rate (BER), signal interference and noise ratio (SINR), a link loss alert, and the like, it is possible to request the spectrum authority for another primary or backup frequency channel.

As described above, a relatively small bandwidth may be requested to be assigned when changing the primary channel. On the contrary, a bandwidth of the backup frequency channel may be differently changed depending on whether a backup channel is a backup channel for enhancing the link availability by simultaneously transmitting and receiving the primary channel and the backup channel, and a backup channel for enhancing the link availability by switching to the backup channel in response to primary channel link loss.

To simultaneously transmit and receive the primary channel and the backup channel, the bandwidth of the primary channel is to be same as that of the backup channel. Accordingly, in the case of the backup channel for enhancing the link availability by simultaneously transmitting and receiving the primary channel and the backup channel, once the bandwidth of the primary channel is changed, the bandwidth of the backup channel is to be changed regardless of a link state of the backup channel.

On the contrary, in the case of the backup channel for enhancing the link availability by switching in response to the primary channel link loss, the bandwidth of the backup channel may be changed separately regardless of the change of the bandwidth of the primary channel.

However, the entire bandwidth of the L band for CNPC that is further likely to be used as the backup channel is less than that of the C band that is further likely to be used as the primary channel. Accordingly, when fixing the bandwidth of the backup channel to the bandwidth required to transmit only necessary information, for example, TC and TM information as in Data Class 1 of Baseline Radio of Radio Technical Commission for Aeronautics (RTCA) Minimum Operational Performance Standards (MOPS), in the emergency case regardless of the bandwidth of the primary channel, the bandwidth of the backup channel is not changed regardless of change of the bandwidth of the primary channel.

Figure 2:
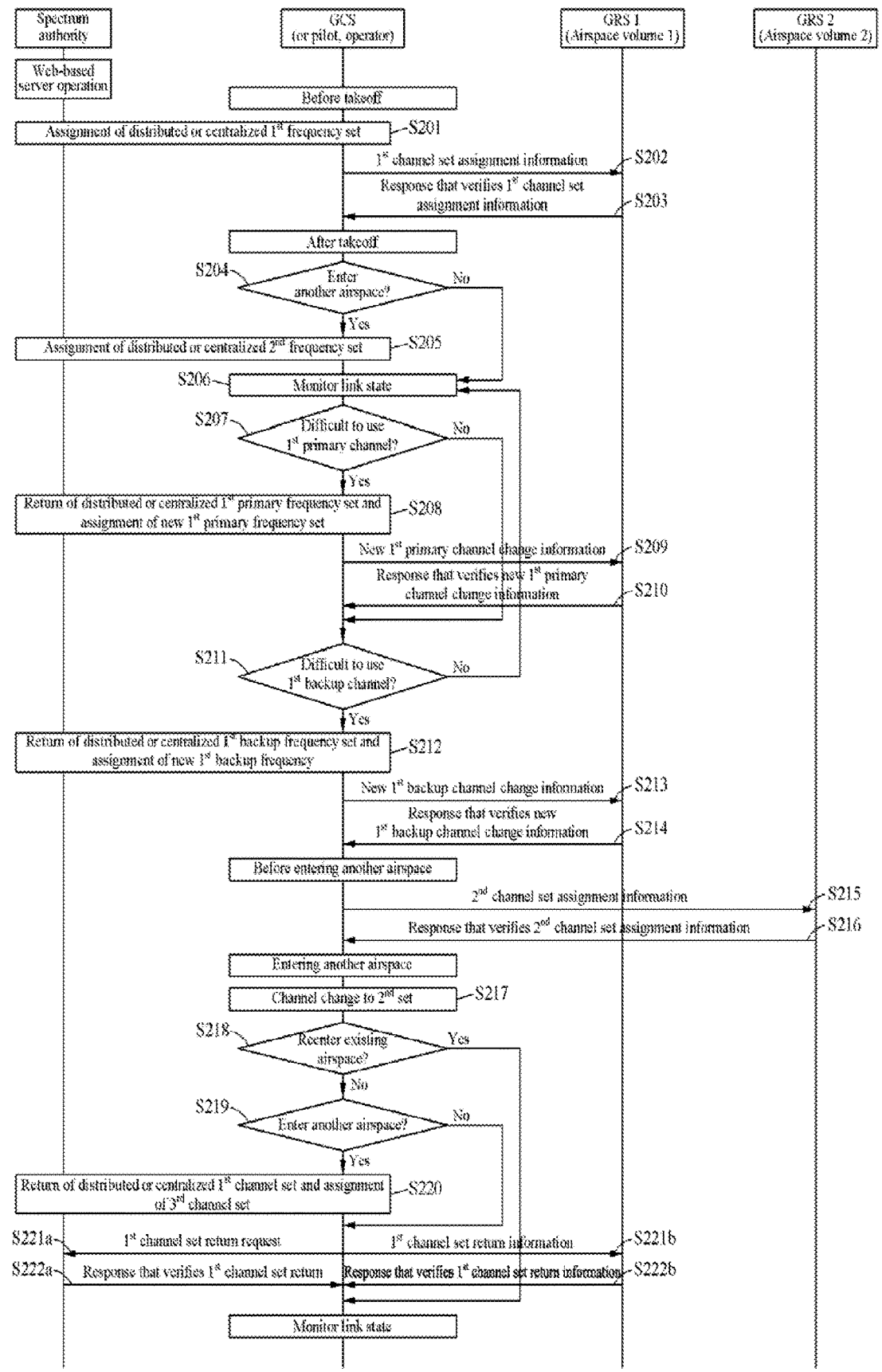
FIG. 2 illustrates an example of a procedure of assigning and changing a channel in a P2P unmanned aircraft CNPC system according to example embodiments.

FIG. 2 illustrates an example of a procedure of assigning and changing a channel in a P2P unmanned aircraft CNPC system according to example embodiments.

Referring to FIG. 2, in operation S201, a spectrum authority assigns a first CNPC frequency channel set to a GCS before takeoff of an unmanned aircraft.

Here, the assigned frequency channel may be a distributed frequency channel or a centralized frequency channel. A description related thereto will be made below.

In operation S202, the GCS transfers channel assignment information to GRS1 for airspace volume 1. In operation S203, the GCS receives a response that verifies assignment information from the GRS1.

When the unmanned aircraft is required to enter airspace volume 2 different from the airspace volume 1 due to the flight plan of the unmanned aircraft after takeoff of the unmanned aircraft in operation S204, the GCS receives assignment of a second CNPC frequency channel set in operation S205.

In operation S206, the GCS monitors a link state of the first CNPC frequency channel.

On the contrary, when the unmanned aircraft is not required to enter the airspace volume 2 different from the airspace volume 1 due to the flight plan of the unmanned aircraft after takeoff in operation S204, the GCS may monitor the link state in operation S206 without receiving the assignment of the second CNPC frequency channel set.

In operation S206, the GCS may continuously monitor the link state of the primary channel and the backup channel while operating the unmanned aircraft CNPC system in the current airspace volume through the first CNPC frequency channel set assigned before takeoff. Link state monitoring may be performed by periodically monitoring a BER/FER, SINR, and the like.

In operations S207 and S211, the GCS determines whether it is difficult to use the first CNPC frequency channel set while monitoring the link state.

Whether it is difficult to use a CNPC frequency channel set may be determined based on whether the link state of the primary channel or the backup channel satisfies a reference value.

When it is difficult to use the CNPC frequency channel set, the GCS may return the channel to the spectrum authority and may receive assignment of a new channel in operations S208 and S212.

To prevent a CNPC link outage, returning and assigning the primary channel and backup channel set may be sequentially performed instead of being performed simultaneously.

That is, when it is difficult to use all of the primary channel and backup channel set, the GCS may initially return the primary channel to the spectrum authority and receive assignment of a new frequency channel in operation S208, may transfer information about the newly assigned frequency channel to the GRS1 in operation S209, and may receive a response that verifies change information from the GRS1 in operation S210.

The GCS may return the backup channel to the spectrum authority and receive assignment of a new backup frequency channel in operation S212, may transfer information about the newly assigned backup frequency channel to the GRS1 in operation S213, and may receive a response that verifies change information from the GRS1 in operation S214.

Here, sequence of changing the primary channel and the backup channel is not limited thereto. When the backup channel is initially changed, the primary channel may be changed.

Also, when it is difficult to use either the primary channel or the backup channel, only a corresponding channel may be changed.

When the unmanned aircraft enters an airspace volume different from a current airspace volume due to the flight plan of the unmanned aircraft, for example, when the unmanned aircraft is to enter airspace volume 2 while flying in the airspace volume 1, the GCS changes the first CNPC frequency channel set with the second CNPC frequency channel set in operation S217.

The GCS may transfer assignment information of the second CNPC frequency channel set to the GRS, for example, GRS2, for the different airspace volume, for example, the airspace volume 2, before the unmanned aircraft enters the new airspace volume, in operation S215, and may receive a response that verifies the assignment information in operation S216.

When the unmanned aircraft enters the other airspace volume, the GCS operates the CNPC system using the second CNPC frequency channel set in operation S217.

Operations S215 through S217 may be applicable to an emergency situation, for example, a case in which the CNPC system is to be operated using the second CNPC frequency channel as well as a case in which the unmanned aircraft is to enter another airspace volume.

The GCS may determine whether to return the assigned first CNPC frequency channel set, which may be determined based on whether the unmanned aircraft needs to reuse the first CNPC frequency channel by reentering the airspace volume 1 after flying the airspace volume 2.

When the unmanned aircraft reenters the airspace volume 1 immediately after flying in the airspace volume 2 due to the flight plan of the unmanned aircraft in operation S218, the GCS does not return the first CNPC frequency channel set.

However, when the unmanned aircraft enters airspace volume 3 instead of reentering the airspace volume 1 immediately after flying the airspace volume 2 due to the flight plan in operation S219, the GCS returns the first CNPC frequency channel set to the spectrum authority and receives assignment of a third CNPC frequency channel set in operation S220.

Although not illustrated in FIG. 2, GRS3 for airspace volume 3 may receive assignment information of the third CNPC frequency channel set from the GCS and may set the CNPC system. Also, the GRS may transmit a response that verifies channel assignment and change information including setting complete information.

To return the first CNPC frequency channel set, the GCS requests the spectrum authority for return of the first CNPC frequency channel set in operation S221a, and transfers return information of the first CNPC frequency channel set to the GRS1 in operation S221b. The GCS receives a response that verifies return of the first CNPC frequency channel set from the spectrum authority in operation S222a, and receives a response that verifies return information of the first CNPC frequency channel set from the GRS1 in operation S222b.

In operation S221b, the GCS is to notify the GRS1 having used the corresponding channel of channel information assigned from the spectrum authority and channel return information. In operation 222b, the GRS1 may close the CNPC system based on the channel return information transferred from the GCS and may transfer the response that verifies the return information.

The GCS may transfer channel information assigned from the spectrum authority to the GRS3. Here, the GRS3 needs to verify whether the channel information transferred from the GCS is channel assignment information approved from the spectrum authority.

To this end, when the spectrum authority provides channel assignment information to the GCS, the spectrum authority may transmit the channel assignment information to the GRS, and the GRS may verify whether the assigned channel is a valid channel by comparing information provided from the spectrum authority and information provided from the GCS.

However, in the above method, non-CNPC secured wired/wireless link connection between the GRS and the spectrum authority is to be forced.

As a method to outperform the above issue, when the spectrum authority is to transmit channel assignment information to the GCS, the channel assignment information may also be transmitted by adding information, for example, a signature, indicating approval of the spectrum authority to be recognizable only at the GRS and unverifiable at the GCS.

When providing channel assignment information to the GRS, the GCS may also provide information indicating that the channel assignment is approved at the spectrum authority, and the GRS may verify that the channel assignment information is valid information by verifying the information.

When the flight of the unmanned aircraft is terminated in the airspace volume 2 without reentering the airspace volume 1 immediately after flying in the airspace volume 2 due to the flight plan of the unmanned aircraft, the GCS may not return the first CNPC frequency channel set.

Also, when the unmanned aircraft is scheduled to enter the airspace volume 3 before reentering the airspace volume 1 regardless of a schedule of reentering the airspace volume 1, the GCS may return the first CNPC frequency channel set and may receive assignment of a third CNPC frequency channel set to enter the airspace volume 3.

A CPNC frequency assignment and return may be performed because maximum two CNPC frequency channel sets are assignable to a single unmanned aircraft.

In addition to the above situation, the P2P unmanned aircraft CNPC system may need to change the GRS in the same airspace volume or may need to change the airspace volume in the same GRS.

When the GRS is to be changed in the same airspace volume, an existing CNPC channel set may be used and the GCS may change only the GRS without changing a channel.

However, if the GRS is changed, CNPC characteristic information of a changed GRS may differ from that of a basic GRS due to a location change. Thus, an interference situation may vary and the existing channel set may not be used.

In this case, the GCS needs to change a change by requesting the spectrum authority for a new channel set. Although the GCS does not change the existing CNPC channel set since change by interference effect is absent, the GCS needs to provide changed GRS information to the spectrum authority by requesting the changed GRS information and the existing CNPC channel set.

If the airspace volume is changed at the same GRS, the GCS may request the spectrum authority for a CNPC channel set and may provide GRS information, and the GRS may receive assignment of a new channel from the spectrum authority, as in an additional channel assignment procedure for entering another airspace volume.

If a GCS for controlling the unmanned aircraft is transferred, the spectrum authority needs to be notified of related information so that the spectrum authority may monitor a GCS using a corresponding CNPC channel.

In the P2P unmanned aircraft CNPC system, the GCS receives assignment of an uplink/downlink frequency channel (center frequency and channel bandwidth) from the spectrum authority.

In an uplink TDMA/downlink FDMA P2MP unmanned aircraft CNPC system, the GRS receives assignment of an uplink frequency channel (center frequency and channel bandwidth) from the spectrum authority, and the GCS receives assignment of a downlink frequency channel (center frequency and channel bandwidth) from the spectrum authority and an uplink time slot in the uplink frequency channel assigned to the GRS.

Accordingly, in the P2MP unmanned aircraft CNPC system, the GRS registers CNPC transmission/reception device information (transceiver location, waveform, GRS location, antenna pattern, transmission power, receiver sensitivity, etc.) of the GRS to the spectrum authority and, at the same time, receives assignment of the uplink frequency channel (center frequency and channel bandwidth) from the spectrum authority.

The GCS receives information about a GRS to be used due to the flight plan from the spectrum authority, receives assignment of an uplink time slot in a frequency channel assigned to the GRS from the spectrum authority, and receives assignment of a downlink frequency channel from the spectrum channel.

The GCS receives assignment of a CNPC channel from the spectrum authority based on a unit of a CNPC channel set (primary or primary/backup uplink time slot/downlink frequency channel). That is, the GCS requests the spectrum authority for assigning a single primary channel or a primary channel and a single backup channel as a CNPC channel for operating the unmanned aircraft based on the flight plan, the unmanned aircraft/GRS capability, a current CNPC channel use state, and the like.

As described above, a single unmanned aircraft CNPC system may maintain the maximum two CNPC channel sets. Thus, to secure another channel set in a state in which the two CNPC channel sets are secured, the unmanned aircraft CNPC system may return one of the existing channel sets and may request assignment of another channel.

The backup channel (uplink time slot and downlink frequency channel) may be simultaneously assigned together with the primary channel (uplink time slot and downlink frequency channel), or may be assigned independently.

That is, only the backup frequency channel between the primary channel and the backup frequency channel may be changed.

Hereinafter, a channel assignment procedure of the P2MP unmanned aircraft CNPC system will be described with reference to FIGS. 3A through 3C.

Figure 3A:
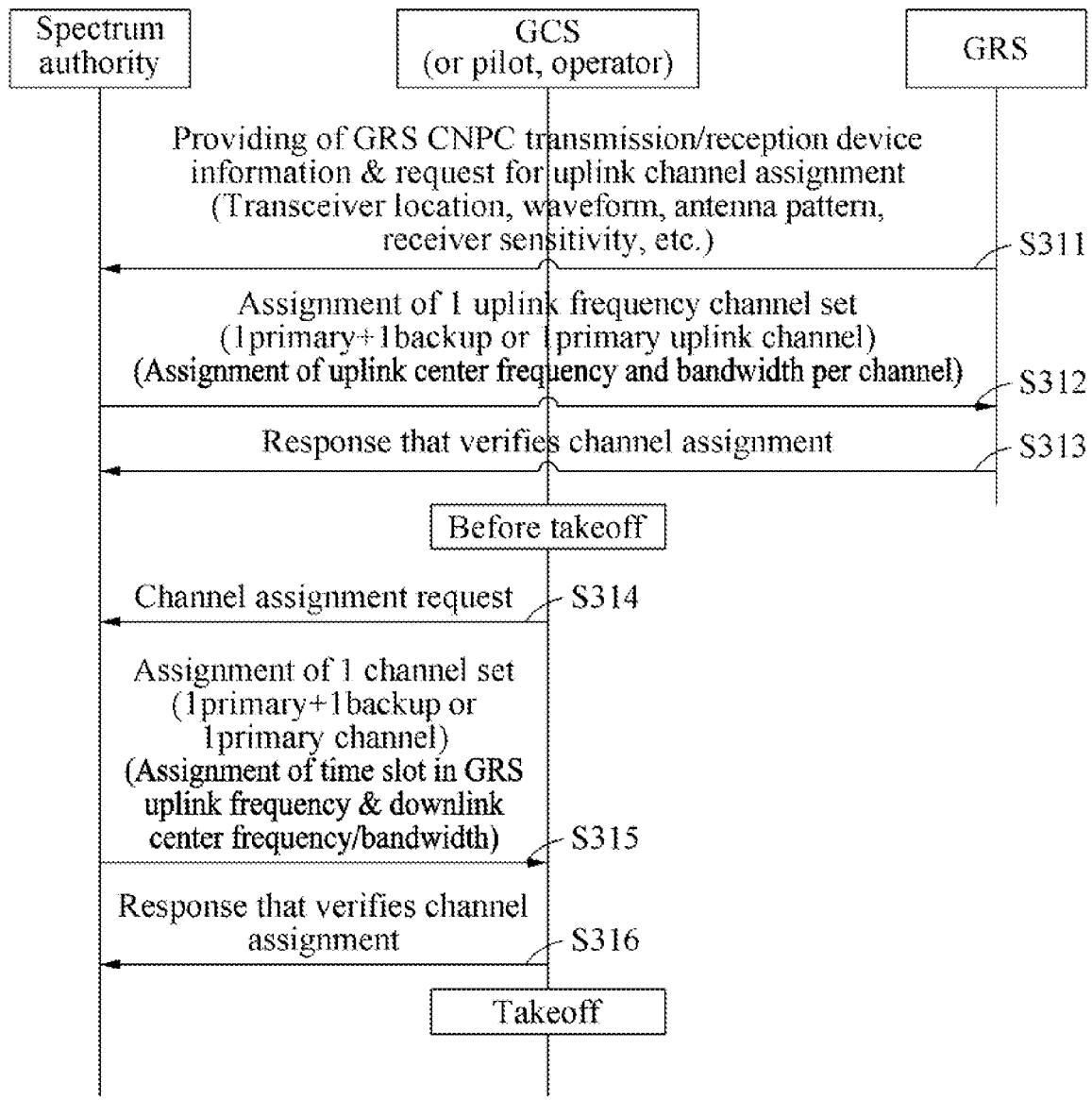
FIGS. 3A through 3C illustrate examples of a new channel assignment procedure after general assignment and channel return in a point-to-multipoint (P2MP) unmanned aircraft CNPC system according to example embodiments.
Figure 3B:
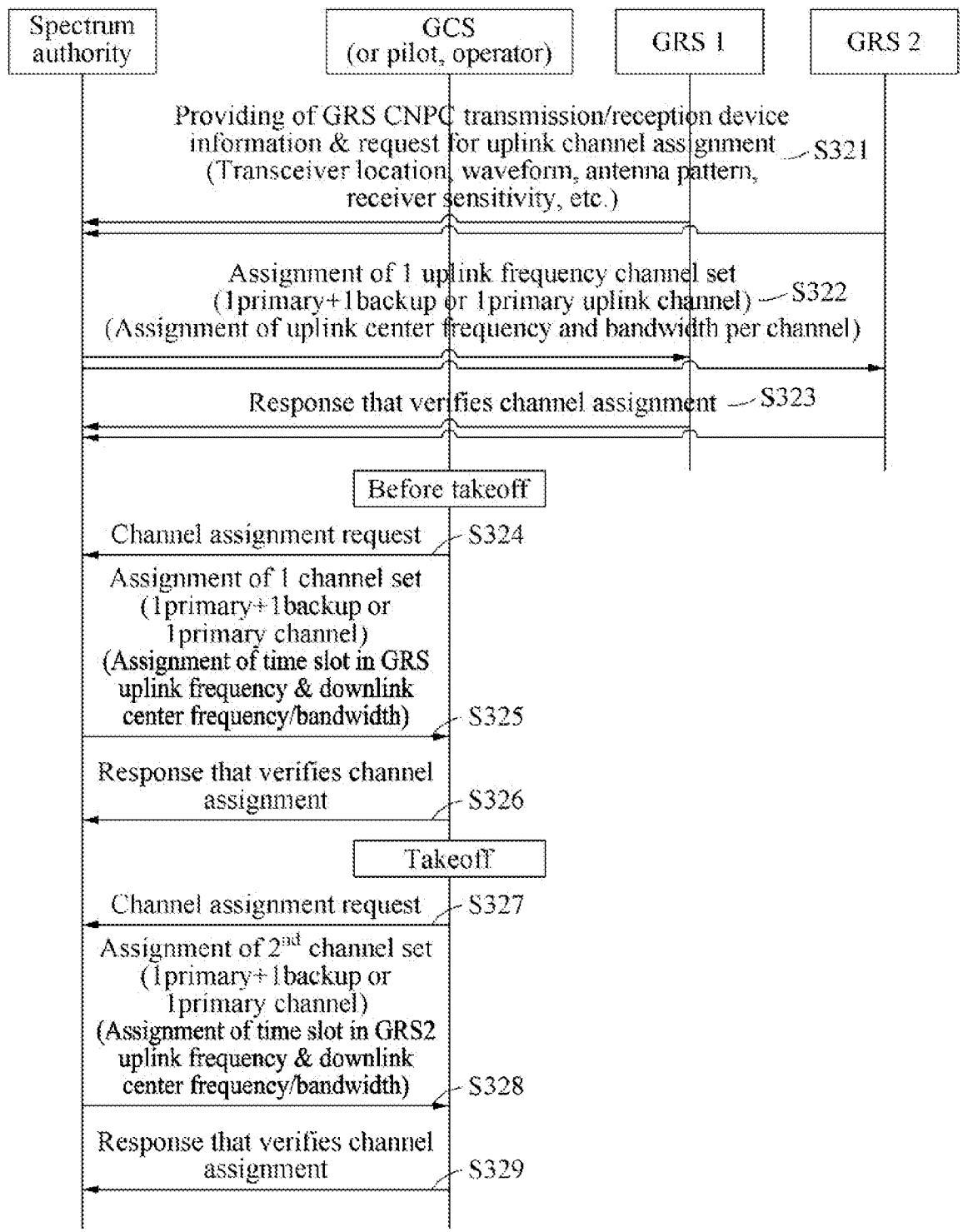
Figure 3C:
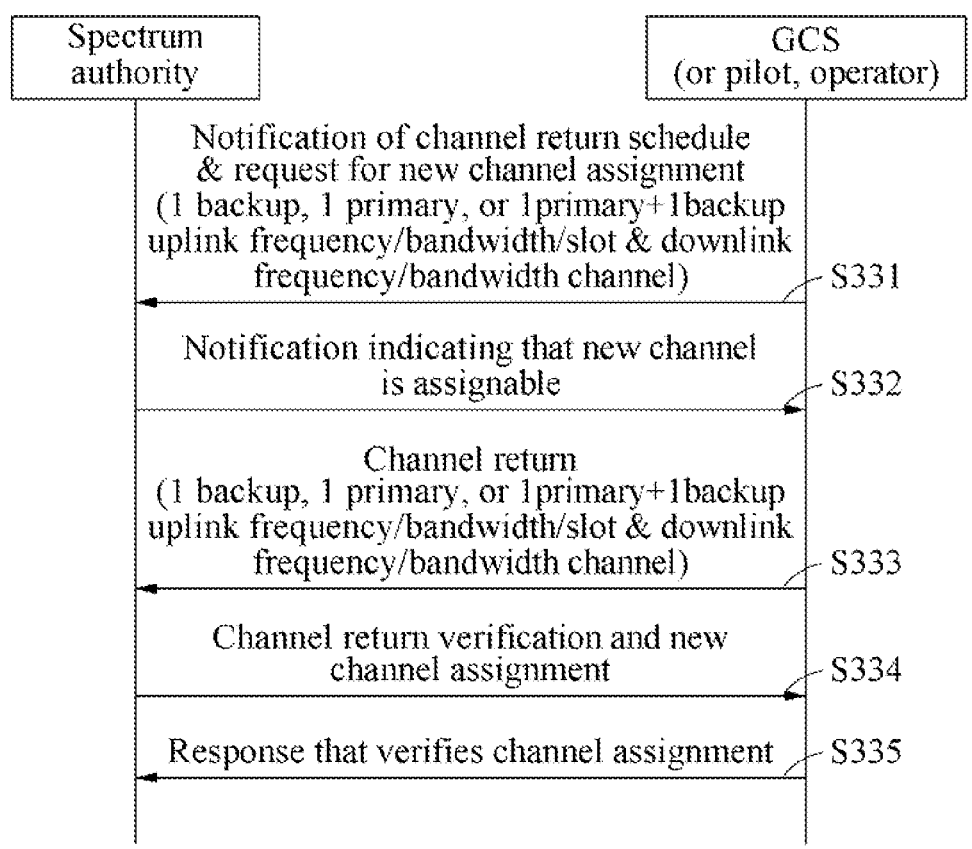

FIGS. 3A through 3C illustrate examples of a new channel assignment procedure after general assignment and channel return in a P2MP unmanned aircraft CNPC system according to example embodiments.

FIG. 3A illustrates an example of assigning a single frequency channel set to the P2MP unmanned aircraft CNPC system according to example embodiments.

In operation S311, a GRS provides CNPC transmission/reception device information (transceiver location, waveform, GRS location, antenna pattern, transmission power, receiver sensitivity, etc.) of the GRS to a spectrum authority and, at the same time, requests the spectrum authority for assigning an uplink channel.

In operation S312, the GRS receives assignment of an uplink frequency channel (center frequency and channel bandwidth) from the spectrum authority.

In operation S313, in response to the channel assignment, the GRS transmits a response that verifies the channel assignment to the spectrum authority.

In operation S314, the GCS requests the spectrum authority for assigning a single CNPC channel set available in the first airspace volume present in a flight path of the unmanned aircraft.

In operation S315, in response to the request, the spectrum authority assigns a frequency channel to the GCS based on a CNPC channel set unit.

Here, the frequency channel to be assigned may include a time slot in a GRS uplink frequency, and a downlink center frequency and channel bandwidth. The channel set may include a primary or primary/backup uplink time slot/downlink frequency channel.

That is, in operation S314, the GCS may request the spectrum authority for assigning a single primary channel or a single primary channel and a single backup channel as a CNPC channel for operating the unmanned aircraft based on the flight plan, the unmanned aircraft/GRS capability, a current CNPC channel use state, etc.

In operation S316, the GCS may transmit a response that verifies the channel assignment to the spectrum authority.

FIG. 3B illustrates an example of assigning an additional frequency set to the P2MP unmanned aircraft CNPC system after assigning a frequency set according to example embodiments.

Operations S321 through S326 of FIG. 3B are the same as operations S311 through S316 of FIG. 3A.

Here, in operations S321 through S323, in the P2MP unmanned aircraft CNPC system, the GRS receives assignment of the uplink frequency channel (center frequency and channel bandwidth). Thus, an additional GRS2 also provides GRS CNPC transmission/reception information and receives assignment of an uplink channel and provides a response that verifies the channel assignment.

A CNPC channel set includes information about an airspace volume in which a corresponding channel is available. When a flight plan to another airspace volume in which the assigned CNPC channel set is unavailable is included in a flight path of the unmanned aircraft, the flight to the other airspace volume needs to be prepared.

In operation S327, after takeoff, the GCS requests the spectrum authority for assigning another CNPC channel set for the flight to the other airspace volume.

In operation S328, in response to the request, the spectrum frequency assigns a frequency channel based on a CNPC channel set unit.

In operation S329, in response to the channel assignment, the GCS transmits a response that verifies the channel assignment to the spectrum authority.

FIG. 3C illustrates an example in which the P2MP unmanned aircraft CNPC system returns the assigned frequency set and receives assignment of a new frequency set according to example embodiments.

If three or more airspace volumes each in which a different CNPC channel set is available are present in the flight path of the unmanned aircraft, the GCS requires three CNPC channel sets in the flight path.

The GCS may continuously request the spectrum authority for assigning a CNPC channel set. However, since a CNPC spectrum is limited, a single unmanned aircraft CNPC system may be limited to maintain maximum two CNPC channel sets.

Accordingly, to secure another channel set in a state in which the two CNPC channel sets are secured, the GCS needs to return one of the existing channel sets to the spectrum authority and then request assignment of another channel.

For example, when the unmanned aircraft is flying in the second airspace volume, the GCS may return an existing single channel used in the first airspace volume and may request the spectrum authority for assigning a CNPC channel available in the third airspace volume.

Referring to FIG. 3C, in operation S331, the GCS notifies the spectrum authority of a channel return schedule, and requests the spectrum authority for assigning a new channel.

That is, the GCS notifies the spectrum authority that the GCS is to return the existing single channel used in the first airspace volume, and requests the spectrum authority for assigning a CNPC channel available in the third airspace volume.

In operation S332, the spectrum authority notifies the GCS that the new channel is assignable.

In operation S333, the GCS returns the maintained channel to the spectrum authority.

In operation S334, the spectrum authority verifies the channel return and assigns the new channel to the GCS.

In operation S335, the GCS receives assignment of the new channel and transmits, to the spectrum authority, a response that verifies the channel assignment.

Also, in operations S331 through S335, when changing the primary channel, the channel bandwidth as well as the center frequency may also be changed. In the case of uplink, the channel bandwidth/number of time slots as well as the center frequency may be changed.

However, during the flight of the unmanned aircraft, change of the channel frequency and the bandwidth is not recommended based on a service rate required at the unmanned aircraft in real time. Thus, only in the case of requesting assignment of another primary channel so that the unmanned aircraft may move to the airspace volume in which the primary frequency channel currently in use is unavailable, change of the downlink frequency band and uplink time slot may also be requested.

In general, when requesting an uplink time slot and a downlink channel bandwidth for the primary channel before takeoff, the assignment may be performed based on a CNPC service to be used during the entire flight of the unmanned aircraft. Thus, when changing the primary channel, change of the uplink time slot and the downlink channel bandwidth may not be considered generally.

However, when entering another airspace volume, a bandwidth that is assigned from the spectrum authority to a GRS used for the unmanned aircraft CNPC system in the airspace volume may differ from a bandwidth that is assigned to the existing GRS. In this case, the uplink center frequency and the channel bandwidth need to be changed.

Also, according to an increase in a number of time slots and the bandwidth requested to be assigned, an amount of time used to receive channel assignment from the spectrum assignment is highly likely to increase. Accordingly, a relatively small downlink bandwidth and uplink time slot may be requested to be assigned based on only a required service. In this case, the channel change may be performed together with change of the center frequency of the uplink/downlink channel based on change in the downlink channel bandwidth and a number of uplink time slots.

Two CNPC channel sets that a single unmanned aircraft CNPC system may simultaneously maintain are for different airspace volumes that do not allow the same CNPC channel based on a frequency reuse policy.

Due to a limited CNPC spectrum, a single unmanned aircraft CNPC system does not simultaneously maintain two CNPC channel sets each available in a single airspace volume.

Accordingly, change of the primary channel and the backup channel in a specific airspace volume may proceed through a procedure of returning an existing channel and receiving assignment of a new channel. In this case, the primary channel and the backup channel may not be simultaneously changed in order to prevent CNPC link outage between return of the existing channel and use of the new channel.

Meanwhile, frequency change of the primary channel or the backup channel in the specific airspace volume is performed generally when a CNPC backup link is in a poor state. When the link state is poor during monitoring the link state of the primary channel or the backup channel, for example, monitoring a BER, an SINR, a link loss alert, and the like, it is possible to request the spectrum authority for another primary or backup frequency channel.

As described above, a relatively small bandwidth and a small number of time slots may be requested to be assigned when changing the primary channel. On the contrary, a downlink frequency bandwidth and a number of uplink time slots of the backup frequency channel may be differently changed based on whether a backup channel is a backup channel for enhancing the link availability by simultaneously transmitting and receiving the primary channel and the backup channel, and a backup channel for enhancing the link availability by switching to the backup channel in response to primary channel link loss.

To simultaneously transmit and receive the primary channel and the backup channel, the number of uplink time slots and the downlink bandwidth of the primary channel are to be same as those of the backup channel. Accordingly, in the case of the backup channel for enhancing the link availability by simultaneously transmitting and receiving the primary channel and the backup channel, once the number of uplink time slots and the downlink bandwidth of the primary channel are changed, the number of uplink time slots and the downlink bandwidth of the backup channel are to be changed regardless of a link state of the backup channel.

On the contrary, in the case of the backup channel for enhancing the link availability by switching in response to the primary channel link loss, the bandwidth of the backup channel may be changed separately regardless of the change of the bandwidth of the primary channel.

However, the entire bandwidth of the L band for CNPC that is further likely to be used as the backup channel is less than that of the C band that is further likely to be used as the primary channel. Accordingly, when fixing the bandwidth of the backup channel to the bandwidth required to transmit only necessary information, for example, TC and TM information as in data class 1 of baseline radio of RTCA MOPS, in the emergency case regardless of the bandwidth of the primary channel, the bandwidth of the backup channel is not changed regardless of change of the bandwidth of the primary channel.

As described above, in the P2MP type, a single GRS simultaneously supports a plurality of unmanned aircrafts. A connection scheme between the single GRS and the plurality of unmanned aircrafts uses a TDMA scheme in the case of uplink and uses an FDMA scheme in the case of downlink.

Accordingly, in the case of uplink, the unmanned aircrafts supported at the single GRS use the same frequency channel and may be identified based on a time slot. Accordingly, the spectrum authority assigns an uplink frequency channel and an uplink time slot to each GCS. The spectrum authority needs to be aware of a GRS to be used at the GCS and time slot assignment information associated with the GRS.

In the case of a GRS, a further large number of time slots may be required according to an increase in a number of unmanned aircrafts supported at the GRS. In this case, a CNPC channel frequency bandwidth is to be increased. However, it may not be easy for the GRS to dynamically change the channel frequency bandwidth since the GRS supports a plurality of unmanned aircrafts.

If the GRS dynamically changes the channel frequency bandwidth, the GRS needs to notify an unmanned aircraft having formed a CNPC communication link with the GRS of the change and the GRS needs to dynamically change a receiver according to the change of the frequency bandwidth of the GRS.

Accordingly, an uplink frequency may be semi-statically assigned to the GRS in order to further efficiently manage a channel and to reduce P2MP communication complexity.

Also, in the case of dynamically changing the uplink frequency channel of the GRS, the GCS using the corresponding GRS needs to transfer channel information to the GRS every time the GCS requests the spectrum authority for a channel. Thus, a network connection between the GRS and the spectrum authority is required. Accordingly, an uplink frequency may be semi-statically assigned to the GRS in order to further efficiently manage a channel and to reduce P2MP communication complexity.

Since an uplink frequency is statically assigned to the GRS during a predetermined amount of time, a method in which a GRS operator assigns in advance an uplink frequency channel based on the GRS capability while registering the GRS and the spectrum authority assigns an uplink time slot and a downlink channel in response to a channel request from the GCS may be employed.

Here, the spectrum authority may immediately transfer, to the GRS, information about a channel assigned to the GCS. Instead of transferring the information to the GRS, the GCS may receive corresponding GRS information from the spectrum authority and may notify the GRS of the corresponding information in response to attempt CNPC communication through the GRS. However, as described above, when transferring channel assignment information to the GRS, an additional network between the spectrum authority and the GRS is required. Thus, channel information may be transferred from the GCS to the GRS, which is similar to the P2P type.

The uplink frequency bandwidth of the P2MP type may be relatively great compared to that of the P2P type. Thus, when a P2P CNPC channel assignment request and a P2MP CNPC channel assignment request coexist, channel assignment for the P2MP type having a relatively wideband may be difficult. Accordingly, when performing frequency assignment with respect to the P2P CNPC and the P2MP CNPC, the spectrum authority may need to separate a frequency to be assigned for the P2P type and a frequency to be assigned for the P2MP type based on the above aspect.

Figure 4:
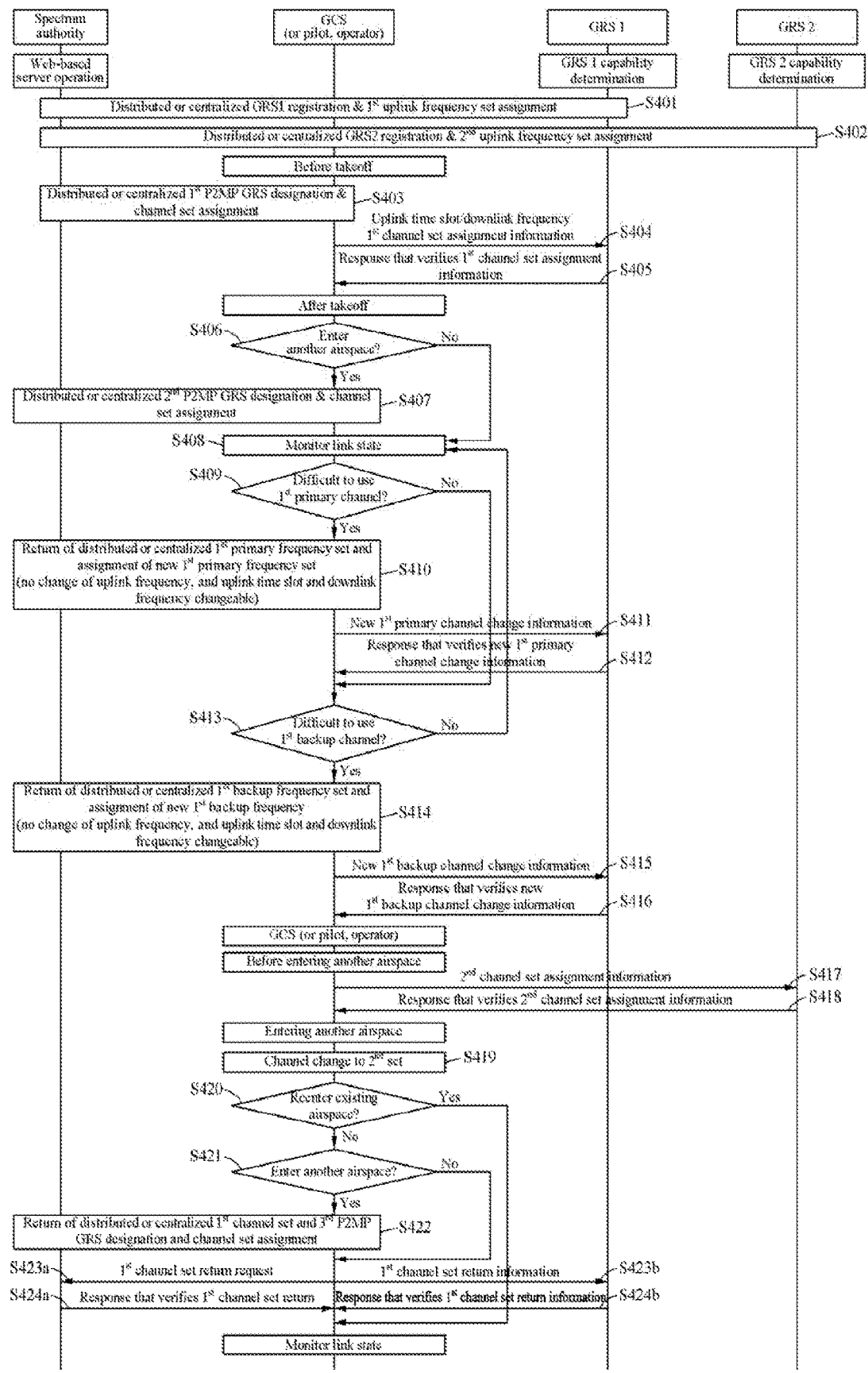
FIG. 4 illustrates an example of a procedure of assigning and changing a channel in a P2MP unmanned aircraft CNPC system according to example embodiments.

FIG. 4 illustrates an example of a procedure of assigning and changing a channel in a P2MP unmanned aircraft CNPC system according to example embodiments.

The channel assignment and change procedure of the P2MP type may be similar to that of the P2P type, however, may differ in that an uplink frequency is assigned to a GRS before a request for channel assignment from a GCS, P2MP GRS information is registered in advance to a spectrum authority, a GRS to be used at the GCS is approved from the spectrum authority, the spectrum authority assigns a time slot and a downlink frequency available in the GRS to the GCS, frequencies of a primary channel and a backup channel in the same airspace volume are changed only in downlink, and only a time slot is changed in uplink.

Operations S403 through S424b of FIG. 4 may be matched to operations S201 through S222b of FIG. 2, and the channel assignment and change procedure of the P2MP type may further include operations S401 and S402. Also, a configuration of a frequency channel set assigned from the spectrum authority to the GCS differs, which will be described with reference to FIG. 4.

In operation S401, a GRS1 registers information of the GRS1 to the spectrum authority and receives assignment of an uplink frequency.

Operation S401 corresponds to operations S311 through S313 of FIG. 3A. The GRS provides CNPC transmission/reception device information (transceiver location, waveform, GRS location, antenna pattern, transmission power, receiver sensitivity, etc.) of the GRS to the spectrum authority and, at the same time, requests the spectrum assignment for assigning an uplink channel. The GRS receives assignment of an uplink frequency channel (center frequency and channel bandwidth) from the spectrum authority. The GRS transmits a response that verifies the channel assignment to the spectrum authority.

In operation S402, a GRS2 registers information of the GRS2 to the spectrum authority and receives assignment of an uplink frequency.

Based on the information, the GCS or the spectrum authority may select available candidate GRSs, may select an appropriate GRS from among the candidate GRSs through an interference analysis, and may select an uplink time slot and a downlink frequency available in the GRS according to distributed and centralized channel assignment methods.

Hereinafter, the distributed and centralized channel assignment method in which the spectrum authority efficiently assigns and manages a limited spectrum for controlling an unmanned aircraft in the national airspace to support the proposed channel assignment method and procedure will be described.

The proposed unmanned aircraft CNPC dynamic channel assignment method may be divided into a distributed channel assignment method and a centralized channel assignment method based on an entity that analyzes a CNPC channel available within the unmanned aircraft CNPC operation range of the national airspace into consideration of the unmanned aircraft flight plan and CNPC operation environment at each GCS, and the like.

The distributed and centralized channel assignment methods of the P2P type will be described with reference to FIGS. 5A and 5B.

Figure 5A:
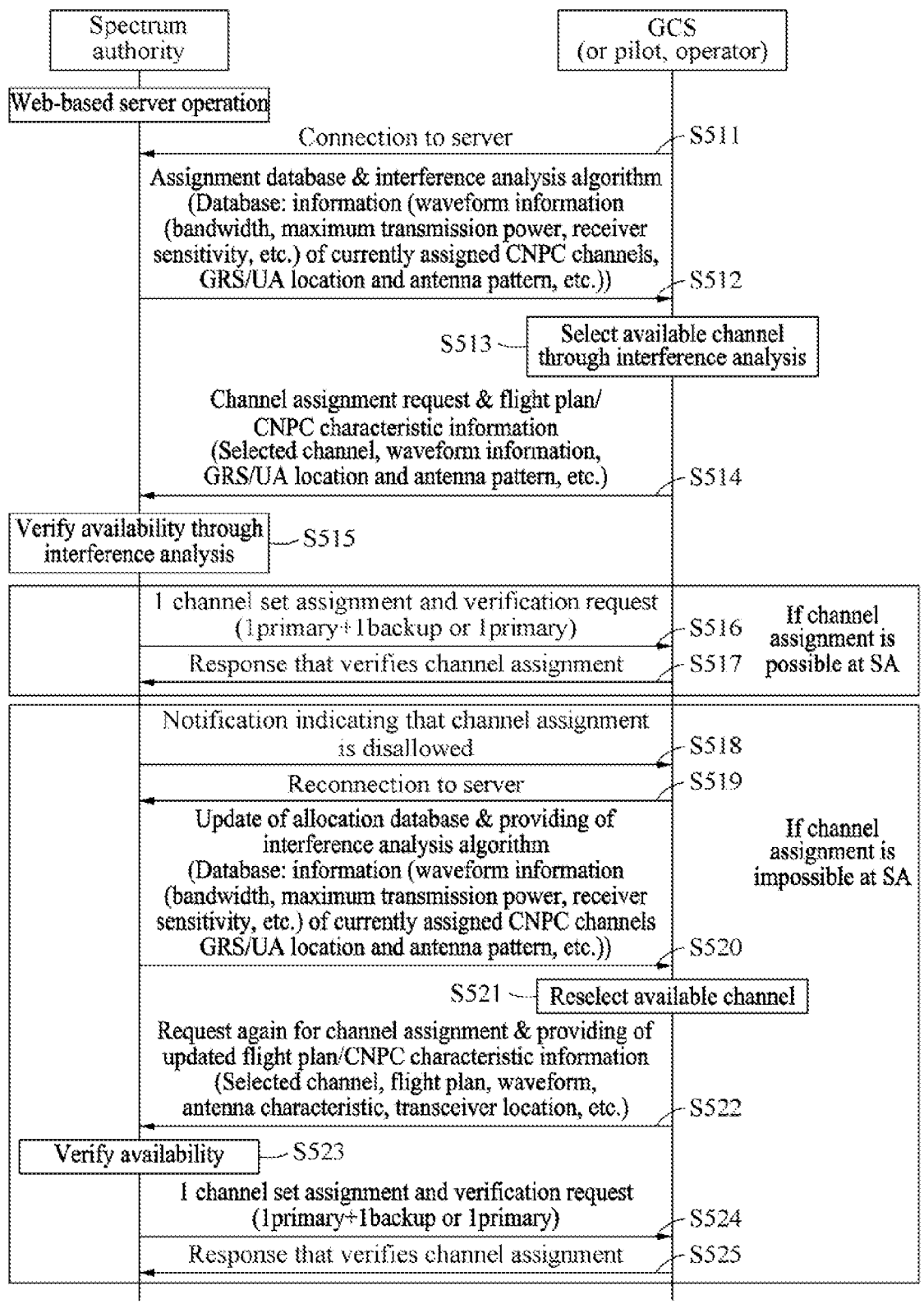
FIG. 5A illustrates an example of a distributed channel assignment procedure in a P2P type according to example embodiments.

FIG. 5A illustrates an example of a distributed channel assignment procedure in a P2P type according to example embodiments.

Figure 5B:
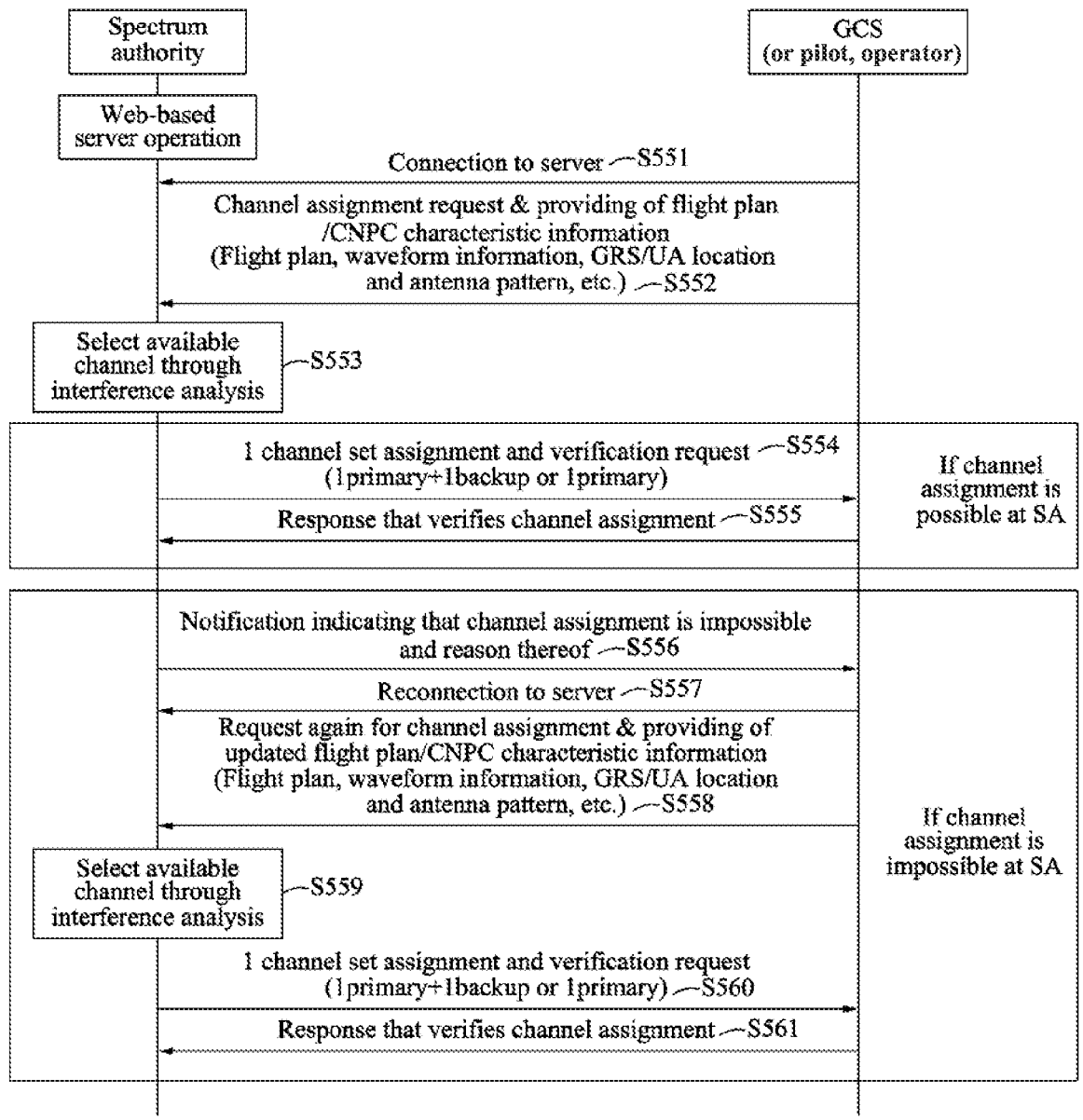
FIG. 5B illustrates an example of a centralized channel assignment procedure in a P2P type according to example embodiments.

FIG. 5B illustrates an example of a centralized channel assignment procedure in a P2P type according to example embodiments.

In the distributed channel assignment method of the P2P type, a GCS analyzes an available channel by considering the flight plan and the CNPC operation environment, etc., based on information provided from a spectrum authority and requests the spectrum authority for a single channel from the analyzed available channel set, and the spectrum authority verifies whether the channels requested from the respective GCSs are safely available in the aerospace volume and determines whether to approve the requested channels.

In the distributed channel assignment method, the GCS is required to select a safe frequency channel to be used during an operation of the unmanned aircraft using an optimal channel selection algorithm tool.

That is, the GCS functions to find an available channel and the spectrum authority functions to verify whether a frequency channel selected at the GCS may be safely available in a CNPC operation area within the aerospace volume through an interference analysis algorithm.

This method may reduce burden of the spectrum authority since the spectrum authority provides only a web-based tool through which the GCS may input flight plan information and selection frequency information through the Internet.

Referring to FIG. 5A, in operation S511, the GCS connects to a server of the spectrum authority.

In operation S512, the spectrum authority provides the interference analysis algorithm to the GCS to determine an assignment database and channel assignment in operation S512. In operation S513, the GCS retrieves an available channel.

The assignment database may include information about a currently assigned unmanned aircraft CNPC channel, for example, information (signal bandwidth, maximum transmission power, receiver sensitivity, etc.) about waveforms of currently assigned CNPC channels, three-dimensional (3D) locations of the GRS and the unmanned aircraft (including GRS and unmanned aircraft mobility information according to the flight plan), an antenna pattern, etc. Also, the spectrum authority provides, to the GCS, the analysis algorithm used to accept and refuse channel assignment.

Here, the interference analysis algorithm may consider a worst situation that may be considered as interference based on database information about all CNPC interference channels in a current CNPC channel assignment situation due to the flight plan of the unmanned aircraft.

The GCS may develop and use a further efficient and optimal channel selection algorithm based on the interference analysis algorithm provided from the spectrum authority.

Accordingly, the GCS may use an algorithm tool for analyzing interference and selecting an optimal CNPC channel based on the interference analysis algorithm provided from the spectrum authority, and the spectrum authority may use an algorithm tool for analyzing interference to determine whether the channel selected at the GCS is available without interference in the current CNPC channel assignment situation.

A priority between GCSs to use a CNPC channel is determined based on a first-come, first-served (FCFS) basis.

In operation S514, the GCS requests the spectrum authority for assigning a channel and provides the flight plane/CNPC characteristic information to the spectrum authority.

When the GCS requests the spectrum authority for a CNPC channel in operation S514, the GCS may provide information (bandwidth, maximum transmission power, receiver sensitivity, etc.) about a CNPC waveform used in association with radio frequency (RF) compatibility, and transceiver antenna patterns and locations of the unmanned aircraft and all of the GRSs to the spectrum authority.

Here, an antenna location is 3D information that includes a minimum altitude and a maximum altitude. In the case of the unmanned aircraft, 3D information including the flight plan and the altitude according to the flight plan of the unmanned aircraft may be provided. In the case of the GRS, 3D information including the altitude associated with an installation location of the GRS may be provided.

If the GRS is a mobile GRS, the GCS may provide movement information of the GRS. The antenna pattern may be provided using 3D antenna beam pattern information that includes minimum/maximum antenna gain information between the GRS and the unmanned aircraft. If a steering antenna is used, steering antenna information, for example, steering beam accuracy, beam antenna gain, etc., of the unmanned aircraft or the GRS during a period of using the CNPC channel may be provided.

The spectrum authority verifies the availability through interference analysis based on the requested channel information and the flight plan and CPNC characteristic information in operation S515, and assigns a channel to the GCS in operation S516.

In operation S517, in response to the channel assignment, the GCS transmits a response that verifies the channel assignment to the spectrum authority.

For the stable operation of the unmanned aircraft in the national aerospace, the GCS reports to the spectrum authority about the CNPC link outrage that causes a situation in which the unmanned aircraft is uncontrollable during at least a predetermined period of time, generally, a few seconds or less, every time the CNPC link outrage occurs.

Also, to update and enhance an interference analysis algorithm for selecting an optimal channel for the GRS by applying an assignment algorithm to an interference situation according to a current CNPC channel assignment situation in real time, the GCS may provide CNPC link state information of the GCS to the spectrum authority.

The CNPC link state information may include, for example, a BER/FER, a SINR, etc. If each numerical value is less than or equal to a reference BER/FER or SINR, the GCS may regard that the CNPC link outrage has occurred and may report to the spectrum authority about the CNPC link outrage.

If the channel assignment is impossible, the spectrum authority notifies the GRS that the channel assignment is disallowed in operation S518. The GCS reconnects to the server of the spectrum authority in operation S519, and verifies whether the assignment database and the interference analysis algorithm are updated and receives related information in operation S520.

In operation S521, the GCS reselects an available channel through interference analysis. In operation S522, the GCS requests again the spectrum authority for assigning a channel and, if the flight plan and the CNPC characteristic information are updated, provides the updated flight plan and CNPC characteristic information to the spectrum authority.

In operation S523, the spectrum authority verifies whether the channel is available through interference analysis based on the requested channel information and the updated flight plan and CNPC characteristic information. In operation S524, the spectrum authority assigns a channel to the GCS.

In operation S525, in response to the channel assignment, the GCS transmits a response that verifies the channel assignment to the spectrum authority.

Hereinafter, the centralized channel assignment method of the P2P type will be described with reference to FIG. 5B. In the centralized channel assignment method of the P2P type, the spectrum authority analyzes and assigns a channel suitable for each GCS having requested the channel assignment, based on the flight plan and CNPC operation environment information (CNPC waveform information, such as bandwidth, maximum transmission power, receiver sensitivity, etc., locations and antenna patterns of the GRS/unmanned aircraft, etc.) provided from each GCS.

That is, in the distributed channel assignment method, the GCS performs the interference analysis and channel selection process. In the centralized channel assignment method, the spectrum authority performs the interference analysis and channel selection process.

In the centralized channel assignment method of the P2P type, a priority between GCSs to use a CNPC channel needs to be defined through an appropriate method in order to optimally utilize insufficient CNPC resources.

In the distributed channel assignment method, the priority may be determined based on a FCFS basis. However, in this case, it may be difficult to efficiently use CNPC resources. The centralized channel assignment method needs to consider a further efficient assignment priority in order to optimally use a limited CNPC frequency.

Referring to FIG. 5B, the GCS connects to the server of the spectrum authority in operation S551, and provides the flight plan and CNPC characteristic information to the spectrum authority and requests the spectrum authority for a CNPC channel in operation S552. The spectrum authority selects one of CPNC channels suitable for the GCS through interference analysis in operation S553 and assigns the selected CNPC channel to the GCS in operation S554. The GCS transmits a response that verifies the channel assignment in operation S555.

If the channel assignment is impossible, the spectrum authority notifies the GCS that the channel assignment is disallowed and in this instance, may also notify the GCS of a reason thereof in the case of the centralized channel assignment method in operation S556, which differs from the distributed channel assignment method.

If the spectrum authority notifies the GCS of the reason why channel assignment is difficult, such as saturation of the CNPC channel, a degraded interference situation, an increase in a number of GCSs that have requested the channel assignment at the same time, and the like, the GCS may update the flight plan and CNPC characteristic information, etc., to be advantageous for the channel assignment based on the notified information.

In operation S557, the GCS reconnects to the server of the spectrum authority. In operation S558, the GCS requests again the spectrum authority for assigning a channel and provides the updated flight plan and CNPC characteristic information.

In operation S559, the spectrum authority selects an available channel through interference analysis based on the requested channel information and the updated flight plan and CNPC characteristic information. In operation S560, the spectrum authority assigns the channel to the GCS.

In operation S561, in response to the channel assignment, the GCS transmits a response that verifies the channel assignment to the spectrum authority.

Hereinafter, distributed and centralized channel assignment methods of a P2MP type will be described with reference to FIGS. 6A and 6B.

Figure 6A:
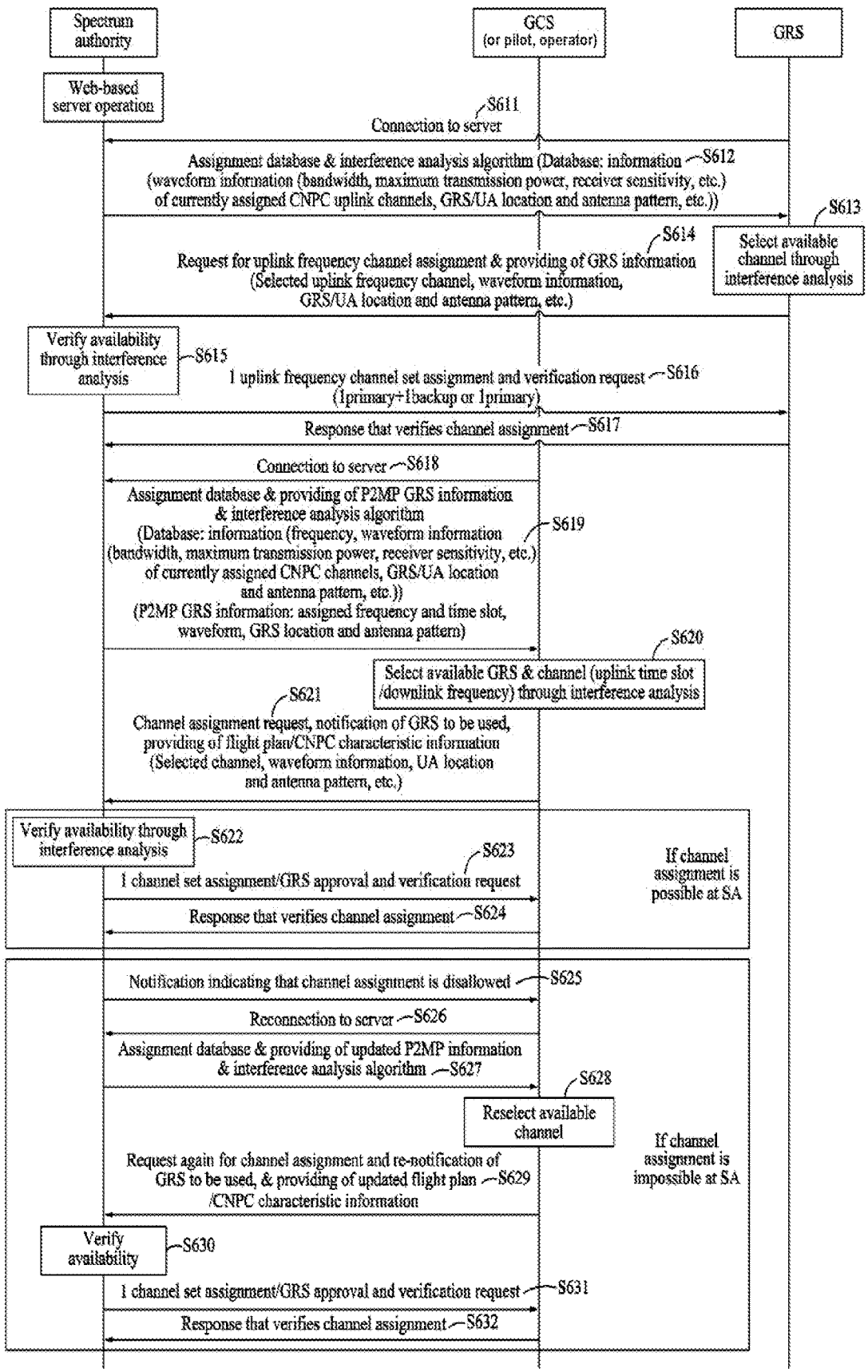
FIG. 6A illustrates an example of a distributed channel assignment procedure in a P2MP type according to example embodiments.

FIG. 6A illustrates an example of a distributed channel assignment procedure in a P2MP type according to example embodiments.

Figure 6B:
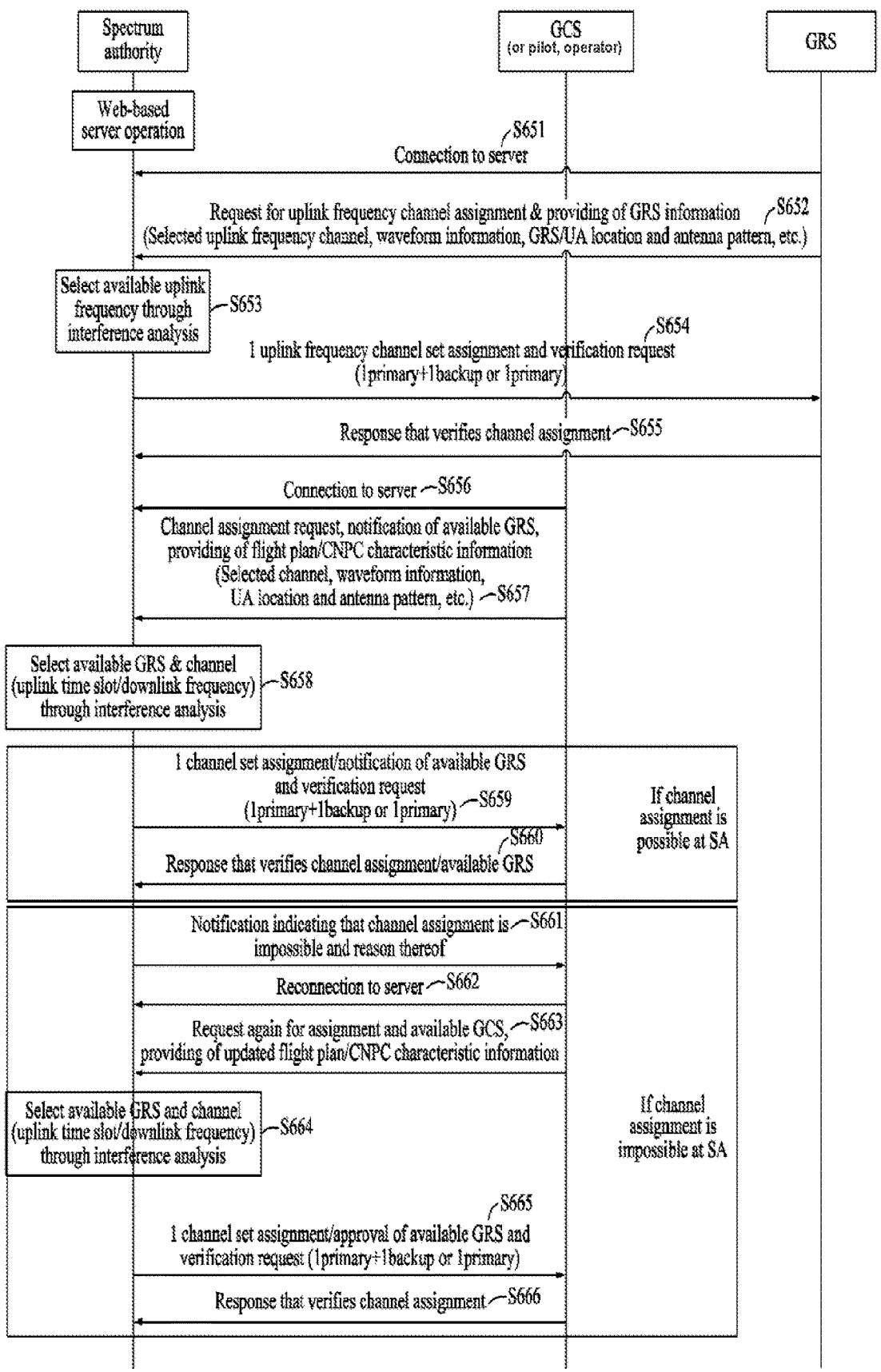
FIG. 6B illustrates an example of a centralized channel assignment procedure in a P2MP type according to example embodiments.

FIG. 6B illustrates an example of a centralized channel assignment procedure in a P2MP type according to example embodiments.

In the P2MP type, a plurality of GRSs are present and thus, a P2MP GRS registers in advance information about the corresponding GRS to a spectrum authority and receives assignment of an uplink frequency to be used at the GRS from the spectrum authority.

In operation S611, the GRS connects to a server of the spectrum authority. In operation S612, the spectrum authority provides, to the GRS, an interference analysis algorithm for determining an assignment database and whether to assign a channel. In operation S613, the GRS retrieves an available channel.

Here, the assignment database may include information about a currently assigned unmanned aircraft CNPC channel, for example, information (signal bandwidth, maximum transmission power, receiver sensitivity, etc.) about waveforms of currently assigned CNPC channels, 3D locations of the GRS and the unmanned aircraft (including GRS and unmanned aircraft mobility information according to the flight plan), an antenna pattern, etc. Also, the spectrum authority provides, to the GCS, the analysis algorithm used to accept and refuse channel assignment.

Here, the interference analysis algorithm may consider a worst situation that may be considered as interference based on database information about all CNPC interference channels in a current CNPC channel assignment situation due to the flight plan of the unmanned aircraft flight plan.

The GRS may develop and use a further efficient and optimal channel selection algorithm based on the interference analysis algorithm provided from the spectrum authority.

Accordingly, the GRS may use an algorithm tool for analyzing interference and selecting an optimal CNPC channel based on the interference analysis algorithm provided from the spectrum authority, and the spectrum authority may use an algorithm tool for analyzing interference to determine whether the channel selected at the GRS is available without interference in the current CNPC channel assignment situation.

A priority between GRSs to use a CNPC channel is determined based on an FCFS basis.

When the GRS requests the spectrum authority for a CNPC channel in operation S614, the GRS may provide information (bandwidth, maximum transmission power, receiver sensitivity, etc.) about a CNPC waveform used in association with RF compatibility, and transceiver antenna patterns and locations of the unmanned aircraft and all of the GRSs to the spectrum authority.

Here, an antenna location is 3D information that includes a minimum altitude and a maximum altitude. In the case of the unmanned aircraft, 3D information including the flight plan and the altitude according to the flight plan of the unmanned aircraft may be provided. In the case of the GRS, 3D information including the altitude associated with an installation location of the GRS may be provided.

If the GRS is a mobile GRS, the GRS may provide movement information of the GRS. The antenna pattern may be provided using 3D antenna beam pattern information that includes minimum/maximum antenna gain information between the GRS and the unmanned aircraft. If a steering antenna is used, steering antenna information, for example, steering beam accuracy, beam antenna gain, etc., of the unmanned aircraft or the GRS during a period of using the CNPC channel may be provided.

In operation S615, the spectrum authority verifies whether the channel is available through interference analysis based on the requested channel information and the flight plan and CNPC characteristic information. In operation S616, the spectrum authority assigns a channel to the GCS.

In operation S617, in response to the channel assignment, the GCS transmits a response that verifies the channel assignment to the spectrum authority.

In operation S618, the GCS connects to the server of the spectrum authority. In the case of uplink, the GCS acquires information about available candidate GRSs together with an existing CNPC channel database provided from the spectrum authority in operation 619, which is similar to the P2P type, and selects an available GRS and a time slot assignable from the GRS through interference analysis in operation S620. In the case of downlink, the GCS receives assignment of a channel in the same manner as in the P2P type.

In operation S621, the GCS requests the spectrum authority for assigning the selected channel, notifies the GRS to be used of the channel assignment, and provides the flight plan and CNPC characteristic information.

When requesting the spectrum authority for assigning a channel, the GCS needs to request the spectrum authority to approve a P2MP GRS to be used. When providing CNPC characteristic information, the GCS has no need to provide GRS related information.

In operation S622, the spectrum authority verifies whether the channel is available through interference analysis based on the requested channel information and the flight plan and CNPC characteristic information. In operation S623, the spectrum authority assigns the channel to the GCS.

In operation S624, in response to the channel assignment, the GCS transmits a response that verifies the channel assignment to the spectrum authority.

If the channel assignment is impossible, the spectrum authority notifies the GCS that the channel assignment is disallowed in operation S625. In operation S626, the GCS reconnects to the server of the spectrum authority. In operation S627, the GCS receives an assignment database, GRS information, and the interference analysis algorithm.

In operation S628, the GCS reselects an available channel through interference analysis based on the received information. In operation S629, the GCS requests again the spectrum authority for assigning a channel and, if the flight plan and the CNPC characteristic information are updated, provides the updated flight plan and CNPC characteristic information to the spectrum authority.

In operation S630, the spectrum authority verifies whether the channel is available through interference analysis based on the requested channel information and the updated flight plan and CNPC characteristic information. In operation S631, the spectrum authority assigns a channel to the GCS and approves the GRS.

In operation S632, in response to the channel assignment, the GCS transmits a response that verifies the channel assignment to the spectrum authority.

Dissimilar to the channel assignment method of the P2P type, the channel assignment method of the P2MP type further includes a process in which the spectrum authority assigns an uplink frequency channel to the GRS. That is, a channel to be assigned to the GRS is an uplink frequency channel, a channel to be assigned to the GCS is a downlink frequency channel and a time slot in an uplink frequency assigned to the GRS in use is assigned.

Here, if the GRS receives a notification indicating that the channel assignment is disallowed from the spectrum authority, the same procedure as a case in which the GCS receives the notification from the spectrum authority may proceed.

Dissimilar to the channel assignment method of the P2P type, the P2MP GRS needs to be registered in advance before the channel is assigned to the GCS. Every time registration information is changed, the GRS notifies the spectrum authority of the change and the spectrum authority updates GRS information.

Hereinafter, the centralized channel assignment method of the P2MP type will be described with reference to FIG. 6B.

In operation S651, the GRS connects to the server of the spectrum authority. In operation S652, the GRS requests the spectrum authority for assigning an uplink frequency channel and provides GRS information.

Registration information may include CNPC waveform information (signal bandwidth, a number of slots, maximum transmission power, receiver sensitivity, etc.) associated with the GRS, GRS antenna pattern information, and GRS transceiver location information. Also, the registration information may include information regarding a mobile GRS and a steering antenna pattern, if necessary.

The spectrum authority selects an uplink frequency available in the GRS through interference analysis in operation S653, and assigns the selected uplink frequency to the GRS in operation S654. In operation S655, the GRS transmits a response that verifies the channel assignment.

In operation S656, the GCS connects to the server of the spectrum authority. In operation S657, the GCS requests the spectrum authority for assigning a channel and notifies the spectrum authority of a GRS to be used, and provides the flight plan and CNPC characteristic information.

In operation S658, the spectrum authority verifies whether the channel is available through interference analysis based on the requested channel information and the flight plan and CNPC characteristic information. In operation S659, the spectrum authority assigns the channel to the GCS.

Similar to the P2P type, in the case of uplink, it is possible to perform interference analysis by acquiring an existing assigned CNPC channel database, information about available candidate GRSs, etc. In this manner, it is possible to request the GRS to be used at the GCS and a time slot assignable from the GRS.

In the case of downlink, a channel is assigned in the same manner as in the P2P type. The GCS needs to notify the spectrum authority of a GRS to be used when requesting the spectrum authority for a selected channel. Dissimilar to the P2P type, GRS related information in CNPC characteristic information to be used at the GCS is already registered to the spectrum authority. Thus, there is no need to provide the GRS related information. The spectrum authority assigns an uplink time slot and a downlink frequency channel and approves the GRS to be used.

In operation S660, the GCS transmits a response that verifies the channel assignment to the spectrum authority.

If the channel assignment is impossible, the spectrum authority notifies the GCS that the channel assignment is disallowed and in this instance, may also notify the GCS of a reason thereof in the case of the centralized channel assignment method in operation S661, which differs from the distributed channel assignment method.

If the spectrum authority notifies the GCS of the reason why channel assignment is difficult, such as saturation of the CNPC channel, a degraded interference situation, an increase in a number of GCSs that have requested the channel assignment at the same time, and the like, the GCS may update the flight plan and CNPC characteristic information, etc., to be advantageous for the channel assignment based on the notified information.

In operation S662, the GCS reconnects to the server of the spectrum authority. In operation S663, the GCS requests again the spectrum authority for assigning a channel and provides the updated flight plan and CNPC characteristic information.

In operation S664, the spectrum authority selects an available channel through interference analysis based on the requested channel information and the updated flight plan and CNPC characteristic information. In operation S665, the spectrum authority assigns the channel to the GCS.

In operation S666, in response to the channel assignment, the GCS transmits a response that verifies the channel assignment to the spectrum authority.

Dissimilar to the channel assignment method of the P2P type, the channel assignment method of the P2MP type further includes a process in which the spectrum authority assigns an uplink frequency channel to the GRS. That is, a channel to be assigned to the GRS is an uplink frequency channel, a channel to be assigned to the GCS is a downlink frequency channel and a time slot in an uplink frequency assigned to the GRS in use is assigned.

Also, the P2MP GRS needs to be registered to the spectrum authority before the channel is assigned to the GCS. Every time registration information is changed, the GRS notifies the spectrum authority of the change and the spectrum authority needs to update GRS information.

When assigning a channel to the GCS, the spectrum authority also needs to designate the P2MP GRS to be used and the GCS has no need to provide GRS related information when providing CNPC characteristic information. In the P2MP type of FIGS. 6A and 6B, channel assignment and change may be performed at the GRS based on a centralized type and at the GCS based on a distributed type, or may be performed at the GRS based on the distributed type and at the GCS based on the centralized type.

Dissimilar to the P2P type, in the case of the P2MP type, a new network may be present. Thus, a different assignment method may be additionally employed based on a role of a control station, a network, and the spectrum authority.

For example, a channel assignment method in which the spectrum authority statically assigns a bandwidth to the GRS and the GRS functions as the spectrum authority may be applied. If the bandwidth is statically assigned to the GRS in a situation in which uplink/downlink frequency bandwidths are asymmetric, the above channel assignment method may inefficiently use a CNPC spectrum in the entire national airspace volume.

As another example, a channel assignment method in which the GRS directly requests the spectrum authority for a CNPC channel based on requirements of GCSs for the GRS may be applied. If the GRS requests a channel, the spectrum authority may have difficulty in stably operating the unmanned aircraft in the nation airspace volume and a CNPC channel used at each GCS.

Figure 7:
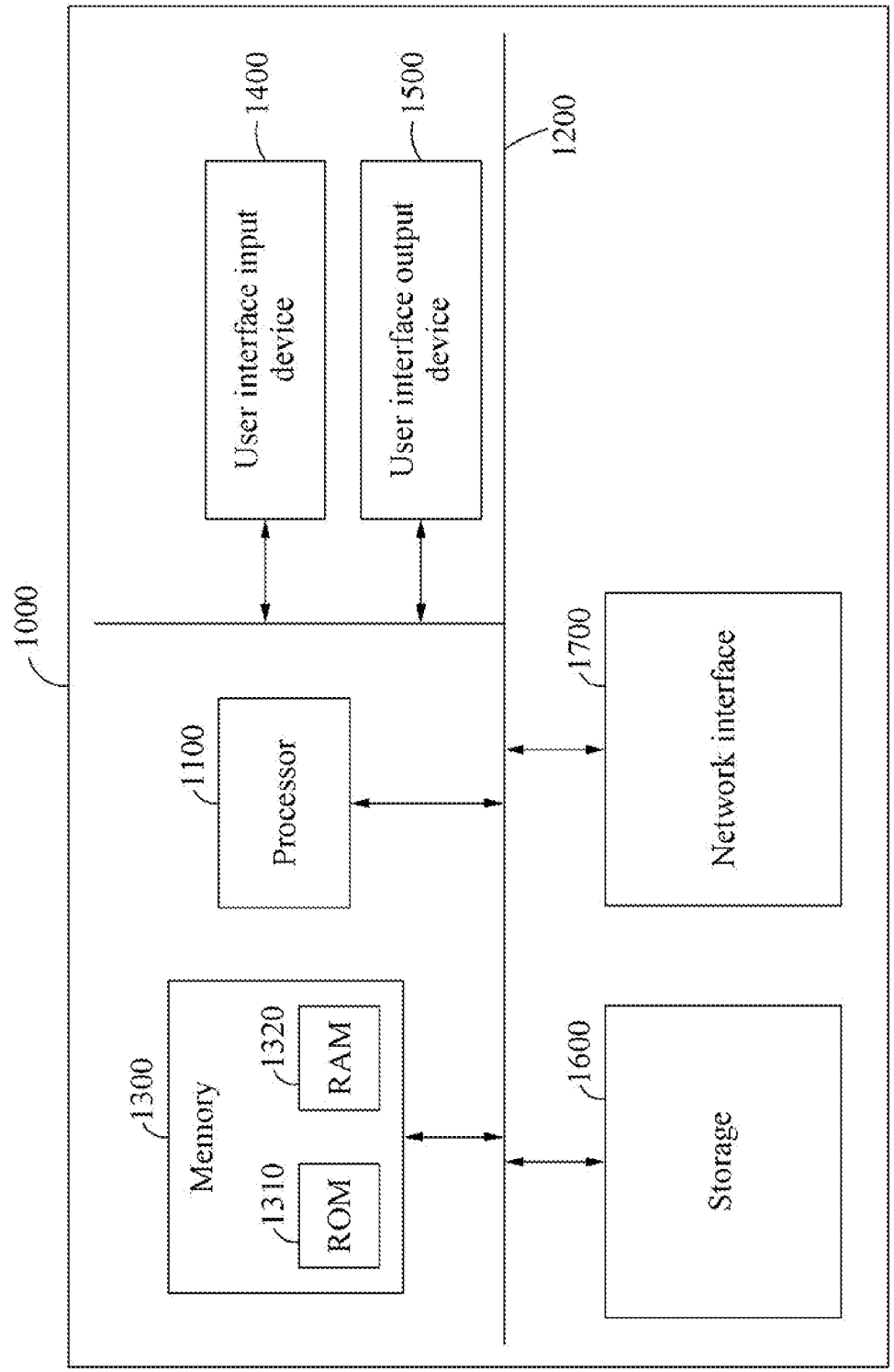
FIG. 7 is a block diagram illustrating a computing system to execute a dynamic channel assignment and change method and procedure for controlling an unmanned aircraft according to example embodiments.

FIG. 7 is a block diagram illustrating a computing system to execute a dynamic channel assignment and change method and procedure for controlling an unmanned aircraft according to example embodiments.

Referring to FIG. 7, a computing system 1000 may include at least one processor 1100, a memory 1300, a user interface input device 1400, a user interface output device 1500, a storage 1600, and a network interface 1700 that are connected through a system bus 1200.

The processor 1100 may be a semiconductor device configured to process instructions stored in a central processing unit (CPU) or the memory 1300 and/or the storage 1600. The memory 1300 and the storage 1600 may include various types of volatile or nonvolatile storage media. For example, the memory 1300 may include read only memory (ROM) 1310 and random access memory (RAM) 1320.

The methods and the operations of the algorithms according to the example embodiments may be configured through a hardware module, a software module, and/or a combination thereof by way of the processor 1100. The software module may be provided to storage media, for example, the memory 1300 and/or the storage, 1600. Examples of the storage media may include a RAM memory, a flash memory, a ROM memory, an erasable programmable ROM (EPROM) memory, an electrically erasable programmable ROM (EEPROM) memory, a register, a hard disk, a detachable disk, CD-ROM, etc. The storage media may be coupled with the processor 1100, and the processor 1100 may read information from the storage media and write information in the storage media. As another example, the storage media and the processor 1100 may be provided in an integral type. The processor 1100 and the storage media may be present in an application specific integrated circuit (ASIC). The ASIC may be present in a user terminal. Also, the processor 1100 and the storage media may be present as individual components within the user terminal.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A dynamic channel assignment method of a point-to-multipoint (P2MP) unmanned aircraft system (UAS) comprising a spectrum authority, a ground control station (GCS), a ground radio station (GRS) supporting a plurality of unmanned aircrafts, and an unmanned aircraft, the method comprising:
    transmitting, at the GRS, information of the GRS to the spectrum authority, and receiving assignment of an uplink frequency set from the spectrum authority;
    registering, at the spectrum authority, the uplink frequency set and information of the GRS to a database of the spectrum authority;
    receiving, at the GCS, assignment of a first communication channel set for communication between the GCS and the unmanned aircraft from the spectrum authority before takeoff of the unmanned aircraft;
    receiving, at the GCS, assignment of a second communication channel set before the unmanned aircraft enters a second area when the unmanned aircraft is to move from a first area in which the first communication channel set is available to the second area in which the second communication channel set different from the first communication channel set is available due to a flight plan of the unmanned aircraft after takeoff of the unmanned aircraft;
    performing, at the GCS, communication with the unmanned aircraft using the second communication channel set when the unmanned aircraft enters the second area;
    maintaining, at the GCS, the first communication channel set when the unmanned aircraft reenters the first area from the second area due to the flight plan of the unmanned aircraft, and returning, at the GCS, the first communication channel set to the spectrum authority when the unmanned aircraft does not reenter the first area due to the flight plan of the unmanned aircraft; and
    monitoring, at the GCS, a link state of a communication channel set in use,
    wherein the communication channel set includes a primary channel and a backup channel,
    wherein monitoring, at the GCS, includes monitoring a signal interference and noise ratio (SINR) of the primary channel and requesting the spectrum authority for another primary channel, different from the primary channel, based on the SINR of the primary channel, and
    wherein monitoring, at the GCS, includes monitoring a SINR of the backup channel and requesting the spectrum authority for another backup channel, different from the backup channel, based on the SINR of the backup channel.

2. The method of claim 1, further comprising:
    returning, at the GCS, the first communication channel set to the spectrum authority and receiving assignment of a third communication channel set available in a third area from the spectrum authority when the unmanned aircraft enters the third area due to the flight plan of the unmanned aircraft.

3. The method of claim 1, further comprising:
    changing, at the GCS, the communication channel set by returning the communication channel set in use to the spectrum authority and by receiving assignment of a new communication channel set when the link state of the communication channel set in use does not satisfy a reference value.

4. The method of claim 3, wherein the receiving the assignment of the communication channel set comprises receiving an approval of a GRS used at the GCS from the spectrum authority, and receiving assignment of a time slot in an uplink frequency assigned to the GRS and a downlink frequency as the communication channel set, and the changing of the communication channel set comprises changing, at the GCS, the downlink frequency of the communication channel set and the time slot of the uplink frequency.

5. The method of claim 3, wherein
the primary channel and the backup channel are selected from different frequency bands, respectively.

6. The method of claim 5, wherein the changing of the communication channel set comprises initially changing one of the primary channel and the backup channel included in the communication channel set and subsequently changing a remaining one thereof.

7. The method of claim 1, further comprising:
providing, at the GCS, information of a communication channel set assigned from the spectrum authority to the GRS; and
verifying, at the GRS, whether the communication channel set is assigned from the spectrum authority, based on information of the communication channel set.

8. The method of claim 7, wherein the spectrum authority further provides information indicating that the communication channel set is assigned from the spectrum authority when assigning the communication channel set to the GCS,
information of the communication channel set provided from the GCS to the GRS includes information indicating that the communication channel set is assigned from the spectrum authority, and
the GRS verifies whether the communication channel set is assigned from the spectrum authority based on information indicating that the communication channel set is assigned from the spectrum authority.

* * * * *